(12) United States Patent
Dugan et al.

(10) Patent No.: US 6,788,649 B1
(45) Date of Patent: *Sep. 7, 2004

(54) METHOD AND APPARATUS FOR SUPPORTING ATM SERVICES IN AN INTELLIGENT NETWORK

(75) Inventors: Andrew Dugan, Superior, CO (US); David McDyson, Richardson, TX (US); Sami Syed, Tervuren (BE)

(73) Assignee: MCI, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/420,657

(22) Filed: Oct. 19, 1999

Related U.S. Application Data

(63) Continuation-in-part of application No. 09/128,495, filed on Aug. 3, 1998, now Pat. No. 6,078,586, which is a continuation-in-part of application No. 09/128,937, filed on Aug. 5, 1998, now Pat. No. 6,418,461.
(60) Provisional application No. 60/104,890, filed on Oct. 20, 1998.

(51) Int. Cl.[7] .......................... H04L 12/56; G06F 13/00
(52) U.S. Cl. .................. 370/254; 370/395.31; 370/397; 370/409; 379/221.08; 379/221.15; 709/202
(58) Field of Search ................................ 370/230, 231, 370/235, 236, 252, 254, 389, 392, 395.1, 396, 397, 395.3, 395.31, 400, 401, 409, 465, 466, 467, 477; 379/88.17, 93.01, 93.07, 93.08, 93.15, 201.01, 201.02, 201.03, 220.01, 221.07, 221.08, 221.14, 221.15, 269; 709/200, 201, 202, 203, 217, 218, 219, 223, 224, 238, 249

(56) References Cited

U.S. PATENT DOCUMENTS 4,713,806 A  12/1987  Oberlander 5,157,390 A  10/1992  Yoshie et al.
5,168,515 A  12/1992  Grechter et al.
5,323,452 A   6/1994  Dickman et al.
5,335,268 A   8/1994  Kelly, Jr. et al.

(List continued on next page.)

FOREIGN PATENT DOCUMENTS

| WO | 95/23483 | 8/1995 |
|---|---|---|
| WO | 96/13949 | 5/1996 |
| WO | 96/20448 | 7/1996 |
| WO | 98/09421 | 3/1998 |
| WO | 00/23898 | 4/2000 |
| WO | 00/24182 | 4/2000 |

OTHER PUBLICATIONS

Stowe, M. "Service Management for the Advanced Intelligent Network" Countdown to the New Milennium. Phoenix, Dec. 2–5, 1991, Proceeding of the Global Telecommunications Conference, (Globecom), New York, IEEE, US, vol. 3, Dec. 2, 1991, pp. 1667–1671.

Primary Examiner—Alpus H. Hsu

(57) ABSTRACT

An intelligent network implementing processes and apparatus for supporting ATM/Vnet services. The intelligent network comprises the ability to receive an ATM VNET call at an ATM switch associated with a service node of the intelligent network, translate the dialed VNET number and then extend the call to a correct termination. Prior to the outdial, source address and subscription validation, destination address screening, source address screening and VNET number translation are performed. In one embodiment, assuming that the VNET call is an ATM to ATM call, no number translation is required. In placing Vnet/ATM calls, the network does all resource allocation, e.g., bandwidth reservation and allocation. The resource specification in the ATM setup message (e.g., bandwidth) is validated against the customer's subscription versus the current network utilization.

34 Claims, 14 Drawing Sheets

U.S. PATENT DOCUMENTS

| | | |
|---|---|---|
| 5,450,480 A | 9/1995 | Man et al. |
| 5,463,682 A | 10/1995 | Fisher et al. |
| 5,475,817 A | 12/1995 | Waldo et al. |
| 5,537,466 A | 7/1996 | Taylor et al. |
| 5,551,035 A | 8/1996 | Arnold et al. |
| 5,619,557 A | 4/1997 | Van Berkum |
| 5,644,629 A | 7/1997 | Chow |
| 5,664,102 A | 9/1997 | Faynberg |
| 5,742,668 A | 4/1998 | Pepe et al. .................. 455/415 |
| 5,748,896 A | 5/1998 | Daly et al. |
| 5,754,639 A | 5/1998 | Flockhart et al. |
| 5,754,939 A | 5/1998 | Herz et al. |
| 5,774,668 A | 6/1998 | Choquier et al. |
| 5,799,153 A | 8/1998 | Blau et al. |
| 5,812,533 A | 9/1998 | Cox et al. .................. 370/259 |
| 5,825,865 A | 10/1998 | Oberlander et al. |
| 5,825,869 A | 10/1998 | Brooks et al. |
| 5,826,268 A | 10/1998 | Schaefer et al. |
| 5,828,747 A | 10/1998 | Fisher et al. |
| 5,838,970 A | 11/1998 | Thomas |
| 5,867,498 A | 2/1999 | Gillman et al. |
| 5,881,134 A | 3/1999 | Foster et al. |
| 5,892,946 A | 4/1999 | Woster et al. |
| 5,898,839 A | 4/1999 | Berteau |
| 5,907,607 A | 5/1999 | Waters et al. |
| 5,915,008 A | 6/1999 | Dulman |
| 5,923,892 A | 7/1999 | Levy |
| 5,940,616 A | 8/1999 | Wang |
| 5,958,016 A | 9/1999 | Chang et al. |
| 5,966,434 A | 10/1999 | Schafer |
| 5,991,811 A | 11/1999 | Ueno et al. |
| 5,999,965 A | 12/1999 | Kelly |
| 6,014,700 A | 1/2000 | Bainbridge et al. |
| 6,041,109 A | 3/2000 | Cardy et al. |
| 6,041,117 A | 3/2000 | Androski |
| 6,044,142 A | 3/2000 | Hammarstrom et al. |
| 6,044,264 A | 3/2000 | Huotari et al. ........... 455/414.1 |
| 6,044,368 A | 3/2000 | Powers |
| 6,078,586 A * | 6/2000 | Dugan et al. ............... 370/395 |
| 6,085,030 A | 7/2000 | Whitehead et al. |
| 6,101,616 A | 8/2000 | Joubert et al. |
| 6,122,510 A | 9/2000 | Granberg |
| 6,134,530 A | 10/2000 | Bunting et al. |
| 6,182,109 B1 | 1/2001 | Sharma et al. |
| 6,208,856 B1 | 3/2001 | Jonsson ..................... 455/424 |
| 6,209,018 B1 | 3/2001 | Ben-Shachar et al. ...... 718/105 |
| 6,266,406 B1 | 7/2001 | Mercouroff et al. |
| 6,295,353 B1 | 9/2001 | Flockhart et al. |
| 6,321,323 B1 | 11/2001 | Nugroho et al. |
| 6,324,275 B1 | 11/2001 | Yagel et al. |
| 6,327,355 B1 | 12/2001 | Britt |
| 6,330,326 B1 | 12/2001 | Whitt |
| 6,333,931 B1 | 12/2001 | LaPier et al. ............... 370/385 |
| 6,360,266 B1 | 3/2002 | Pettus |
| 6,363,411 B1 * | 3/2002 | Dugan et al. ............... 709/202 |
| 6,366,657 B1 | 4/2002 | Yagel et al. |
| 6,393,481 B1 * | 5/2002 | Deo et al. .................. 709/224 |
| 6,418,461 B1 | 7/2002 | Barnhouse et al. |
| 6,430,600 B1 | 8/2002 | Yokote |
| 6,453,038 B1 | 9/2002 | McFarlane et al. |
| 6,564,270 B1 | 5/2003 | Andert et al. |
| 6,628,769 B1 | 9/2003 | Vleer et al. |

* cited by examiner

METHOD AND APPARATUS FOR SUPPORTING ATM SERVICES IN AN INTELLIGENT NETWORK

CROSS-REFERENCE TO RELATED APPLICATION

The following patent application is a continuation-in-part and claims the benefit of U.S. patent application Ser. No. 09/128,495 filed Aug. 3, 1998 entitled "ATM Virtual Private Networks", now U.S. Pat. No. 6,078,586, the whole contents and disclosure of which is incorporated by reference as if fully set forth herein. Additionally, the present application is also a continuation-in-part and claims the benefit of U.S. patent application Ser. No. 09/128,937 filed Aug. 5, 1998, now U.S. Pat. No. 6,418,461. The present application also claims the benefit of U.S. Provisional Patent Application Serial No. 60/104,890 filed Oct. 20, 1998, the entire contents and disclosure of which is hereby incorporated by reference as if fully set forth herein.

FIELD OF THE INVENTION

The present invention relates generally to intelligent network systems for providing communications services, and specifically, to a novel method and apparatus for supporting Virtual network ("Vnet") and Asynchronous Transfer Mode ("ATM") communications services in an intelligent network.

BACKGROUND OF THE INVENTION

In communications networks comprising circuit-switched, packet-switched and/or frame relay communications technology, virtual private networks have been established as a measure to provide voice and data communications services at reduced costs, e.g., for a corporate enterprise. In such networks, communications is enabled between subscribing members of the VPN, with such subscribing members typically comprising corporate employees or preferred corporate customers at different locations throughout the United States and internationally.

In some instances, VPNs are overlayed onto the circuit-switched, e.g., public switched telephone network (PSTN), however, increasingly, are implemented over wide area networks implementing frame relay and/or packet-switched technologies. For example, packet-switched Asynchronous Transfer Mode (ATM) technology enables a carrier to provide integrated data, video, and voice services over a single network. In accordance with standard ATM technology, a shared ATM network 10, such as shown in FIG. 1, transfers and routes video, data, and voice traffic in 53 byte fixed-length packets from a source 12 to a destination 15 over a series of ATM switches 20*a–g* and interconnected links. The capability of carrying multi-media traffic on a single network makes ATM the preferred technology for B-ISDN services. The Asynchronous Transfer Mode protocol is connection-oriented, and traffic for an ATM "call" is routed as cells over a virtual connection that extends from the source to the destination.

As known, a virtual connection is comprised of Virtual Channels (VC) and Virtual Paths (VP) in a multiplexing hierarchy. A physical transmission system is partitioned into multiple VCs and VPs, with some being designated for customer traffic (bearer channels) and some being designated for signaling. A VC is identified by a Virtual Channel Identifier (VCI), and a VP is identified by a Virtual Path Identifier (VPI). Prior to transmitting traffic over a bearer channel, the ATM network sets up an ATM call with signaling messages over a signaling channel. First, a setup message containing a Source Address, representing the location of the call originator, and a Destination Address, representing the location of the call recipient, is received and processed by an originating ATM switch, e.g., switch 20*a*. The originating ATM switch routes the setup message to a terminating ATM switch, e.g., switch 20*f*, via zero or more intermediate switches, in which the terminating ATM switch 20*f* serves the destination address ("DA"). Each ATM switch processes the setup message to ensure that it recognizes the DA and can route the call.

From each switch's processing of the setup message, a virtual connection is established from source to destination to transport the customer traffic as cells over bearer channels. A virtual path or channel connection (VPC or VCC) refers to one or more concatenated links, one of which is depicted as link 25 shown in FIG. 1 connecting two ATM switches. A VP or VC link is defined as the transport between a point at which a VPI/VCI is assigned and a point at which a VPI/VCI is removed or translated. Specifically, at the inbound port of a switch, the VCI/VPI is used to determine the outbound port. The cell is then switched to an outboard port of the switch where a VCI/VPI is assigned to the cell. The cell is then transported to the next switch. Thus, a connection (VCC/VPC) extends from the source, usually the inbound port on the originating ATM switch, to the destination, usually the outbound port on the terminating ATM switch.

The signaling protocol is defined in ATM standards according to network interfaces. The ATM Forum has defined, among other interfaces, a public User-Network Interface ("UNI"), defined as the interface between an ATM user and a public ATM network; a private User-Network Interface, defined as the interface between an ATM user and a private ATM network; and, a Private Network-Network Interface ("PNNI") defined as the network-network interface between two private networks or switching systems. Various features of ATM are enabled by signaling messages defined by these interfaces.

In view of the foregoing, it is readily surmised that the implementation of virtual private networks and ATM communications services is very hardware-dependent, with VPNs implementing many switching and communications platforms.

As in current VPN/ATM networks, a telecommunications Intelligent Network typically consists of one or more switching platforms integrated with one or more intelligent call processing platforms that contain sophisticated computer hardware and software components. These intelligent networks have evolved in parallel with piecemeal and proprietary advances in the communications and computing technology. As a result, today's networks are built with products that are integrated into vendors' proprietary platforms, and that are highly specialized to provide a certain set of functions. Thus, switching platforms are built on a vendor's embedded processors and other hardware components that are under the control that vendor's proprietary software. As Intelligent networks are built with a patchwork of incongruous hardware and software platforms that are each designed to support different services, many incompatibilities are introduced into the network infrastructure, making it increasingly difficult to deploy new services and integrate existing services. Consequently, network operators and service providers are faced with many obstacles in their attempts to offer new services. For example, to implement new services and features, the network operator must rely not only on a switch vendor's proprietary switching hardware, but also on that switch vendor's proprietary software to control switching. Thus, to develop its network infrastructure to support a new service, a network operator must incur the high costs of a switch vendor's platform development. Moreover, the switch vendor process in developing and deploying new services may take an inordinate amount of time, which is completely undesirable in an industry in which speed to market is a critical factor in success.

Since the intelligent call processing services and features extant in current Intelligent Networks tend to rely on a particular vendor's proprietary or specialized mechanisms embedded in the network infrastructure, new services often rely on vertical development efforts that are both costly and time-consuming. Network infrastructure that is developed to support one new service is simply not readily available or flexible enough to support the introduction or deployment other new services. Even the task of modifying or enhancing an existing service to provide new features becomes significant, often requiring extensive re-configuration of intelligent network infrastructure and involving the modification of source code in network processors, which can be intrusive to real-time call processing functions and resulting in network downtime.

One implication of a specialized network infrastructure for each service is that it becomes too costly to provide an advanced service everywhere in the network. As a result, calls must be routed to a specialized service node, prohibiting the optimization of network efficiency. The problem of a specialized network infrastructure for each intelligent service is especially exacerbated as different communications technologies are currently being integrated into hybrid networks. Intelligent network infrastructure that is built to provide services over one type of network, e.g., switched-circuit telephony, is not readily or easily adaptable to provide services over another type of network, e.g., packet-switched. If a network operator needs to provide a traditional telephone service over the Internet or an ATM network, a new intelligent network platform must be built. Even within the context of a switched-circuit telephony network, digital matrix switches from different vendors require different interfaces to, and different features within, the intelligent call processing system.

It would thus be highly desirable to provide an intelligent network infrastructure that supports all call and event processing and communications services and features for any type of switching network, and particularly an Intelligent Network for supporting ATM and VPN services.

SUMMARY OF THE INVENTION

The present invention is directed to an intelligent network implementing processes and apparatus for supporting ATM/Vnet services. Particularly, the intelligent network comprises the ability to receive an ATM VNET call, translate the dialed VNET number and then extend the call to a correct termination. Prior to the outdial, source address and subscription validation, destination address screening, source address screening and VNET number translation are performed. In one embodiment, it may be assumed that the VNET call is an ATM to ATM call requiring no number translation.

In placing Vnet/ATM calls, it is assumed that the network does all resource allocation, e.g., bandwidth reservation and allocation. The resource specification in the ATM setup message (e.g., bandwidth) is validated against the customer's subscription versus the current network utilization.

Particularly, the intelligent network for performing Vnet Services includes a plurality of distributed service nodes, each node providing an execution environment that may provide all of the event processing functionality necessary to handle a call or event at the instance it is received at the resource complex, e.g., router, physically associated with that particular service node. The intelligent network is of a highly scalable architecture and engineered to ensure that telecommunications services, embodied as executable service logic programs (objects) capable of instantiation at each service node, are deployed in a cost-effective manner. The intelligent network additionally provides intelligent event processing services independent of and transparent to the switching platform or resource complex in which an event is received, and is readily adapted to handle call events. Thus, the dependency for expensive, vendor-specific hardware, operating systems and switching platforms, is eliminated. The distributed intelligent network additionally supports location-independent event processing service execution via a network operating system, enabling the modular software logic programs to be run virtually anywhere in the architecture, and provides location-independent communications among these distributed processes, thus eliminating the need for specialized service nodes.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

The above and further advantages of the present invention may be better understood by referring to the following description in conjunction with the accompanying drawings, in which.

DETAILED DESCRIPTION

The present invention is one component of a comprehensive intelligent network alternately referred to herein as the an Intelligent Distributed Network Architecture ("IDNA")

or the Next Generation Intelligent Network ("NGIN"). As described herein, the IDNA/NGIN architecture is designed to perform intelligent call processing services for any type of call received at a resource complex or switching platform, e.g., switch, router, IP termination address, etc. The IDNA/NGIN preferably comprises a plurality of distributed service nodes with each node providing an execution environment providing call processing functionality necessary to handle a call at the instance it is received at the switch or resource complex associated with but physically separated from with that particular service node. The IDNA/NGIN system architecture is highly scalable and engineered to ensure that executable service objects, embodied as independent Service Logic Programs ("SLP"), and associated data for performing event services, e.g., 1-800 telephone call, send fax, etc., may be deployed to and maintained at the service nodes in a cost-effective manner. By employing CORBA-compliant Object Request Broker technology, the intelligent network supports location and platform-independent call processing service execution independent of and transparent to the event switching platform or resource complex in which an event or call is received, and, enables high-level service logic programs ("SLP") and Service Independent Building Blocks ("SIBBS") to execute virtually anywhere in the network independent of the service execution platform. Furthermore, the system provides location-independent communications among these distributed processes. More specifically, IDNA/NGIN is a platform-independent architecture allowing the use of different computing platforms at service nodes and further comprises an underlying systems infrastructure designed to support any and all conceivable event processing services, wherein specialized functions needed for a particular event service are encapsulated in high-level logic programs that are easily written and deployed using the same network infrastructure.

Each of the NGIN components will be generally discussed herein below. Detailed descriptions of each of these components can be found in above-mentioned, co-pending U.S. patent application Ser. No. 09/420,666, now U.S. Pat. No. 6,363,411, entitled AN INTELLIGENT NETWORK and commonly assigned, co-pending U.S. patent application Ser. No. 09/128,937 filed Aug. 5, 1998 entitled "Intelligent Call Platform for an Intelligent Network Distributed Architecture" which claims the benefit of U.S. Provisional Application Serial No. 60/061,173, filed Oct. 6, 1997 both of which are incorporated herein in their entirety by reference thereto.

Figure 2:
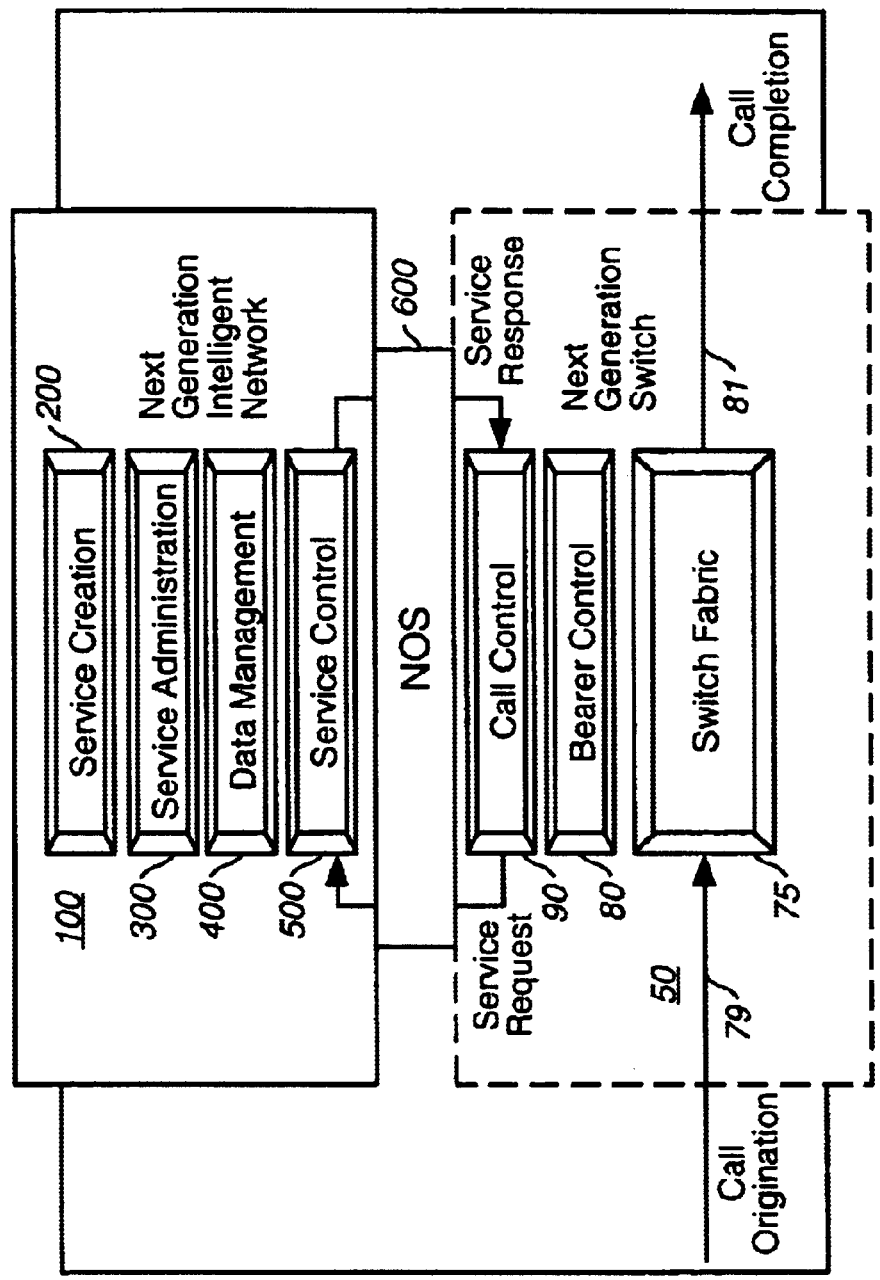
FIG. 2 illustrates the primary functional components of the overall intelligent network of the invention integrated with a telecommunications switching network.

FIG. 2 illustrates the major functional components of the IDNA/NGIN system 100 which includes: 1) a service creation environment ("SCE") component 200 which generally provides a set of tools that assists in the design, creation and testing of services within the NGIN; 2) a service administration ("SA") component 300 which generally supports off-line storage, naming, distribution, activation, deactivation and removal of all NGIN services and data; a data management ("DM") component 400 which generally provides for the run-time storage, replication, synchronization, and availability of data at each service node; a service control ("SC") component 500, which generally provides a framework for the receipt of incoming calls and controls the real-time execution of services; and, a NGIN network operating system ("NOS") component 600 which provides platform independent and location independent connectivity between the NGIN system components.

In FIG. 2, the NGIN system 100 is shown interfacing with a switching platform 50 which, is referred to herein as the Next Generation Switch ("NGS"), the operational details of which is described in commonly assigned, co-pending U.S. patent application Ser. No. 08/580,712 entitled "A Telecommunication System Having Separate Switch Intelligence and Switch Fabric", now U.S. Pat. No. 6,041,109, the whole contents and disclosure of each being incorporated by reference as if fully set forth herein. As shown in FIG. 2, the NGS switching platform 50 generally comprises: a switching fabric component 75 to set up a transport (or "bearer") channel for carrying call traffic by connecting an ingress communications port 79 with an egress communications port 81 in accordance with external commands; a service-independent call control component 90 which performs the first detection of an incoming call, provides commands needed to switch a call independent of a particular service for which a call is received and, maintains a call state model for each call in progress; and, a bearer control component 80 that generally serves as an interface between the various physical switches of the switch fabric 75 and the call control component 90. Specifically, bearer control 80 adapts protocol-specific signals and events to and from the switch fabric, in whatever format is needed by the certain switch fabric component 75, into a common set of signals and events for communication with the call control component 90. As will be hereinafter described, through the intermediary of the NOS component 600, the NGIN system 100 and the call control component 90 of the network switch platform 50 cooperatively interact to perform both intelligent call processing and call switching and routing services.

Figure 1:
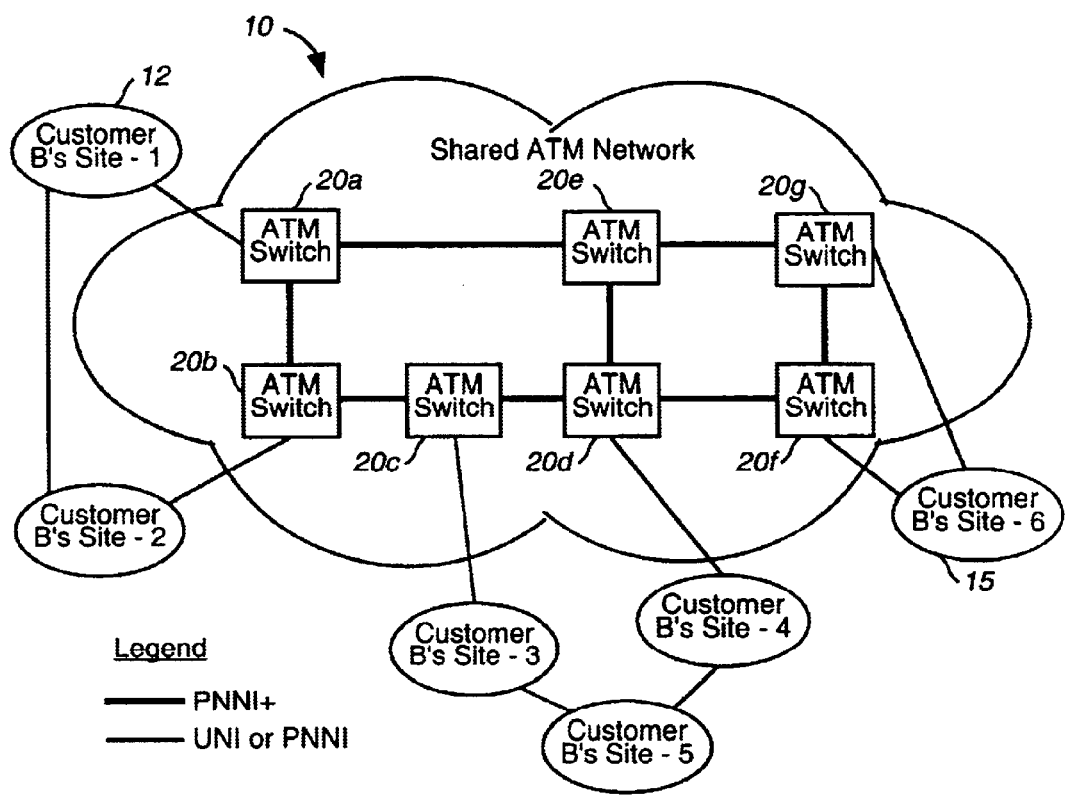
FIG. 1 illustrates a prior art shared ATM network for providing virtual private network voice and data services.

It should be understood that the NGS switching platform 50 shown in FIG. 2, may be part of a larger "resource complex" or telecommunications network, which may include other call control and switching components (e.g., Internet Gateway, Intelligent peripherals, wireless, LEC, International Gateways, etc.) capable of handling any type of call event, including, but not limited to, circuit-switched or packet-switched (ATM) receipt of voice, audio, video, fax and call conferencing, etc. The description herein assumes the NGS connectivity as shown in FIG. 1, however, it should be understood that, from the NGIN system perspective, the switching platform 50 is viewed as any resource complex, containing vender-specific components or otherwise.

Figure 3:
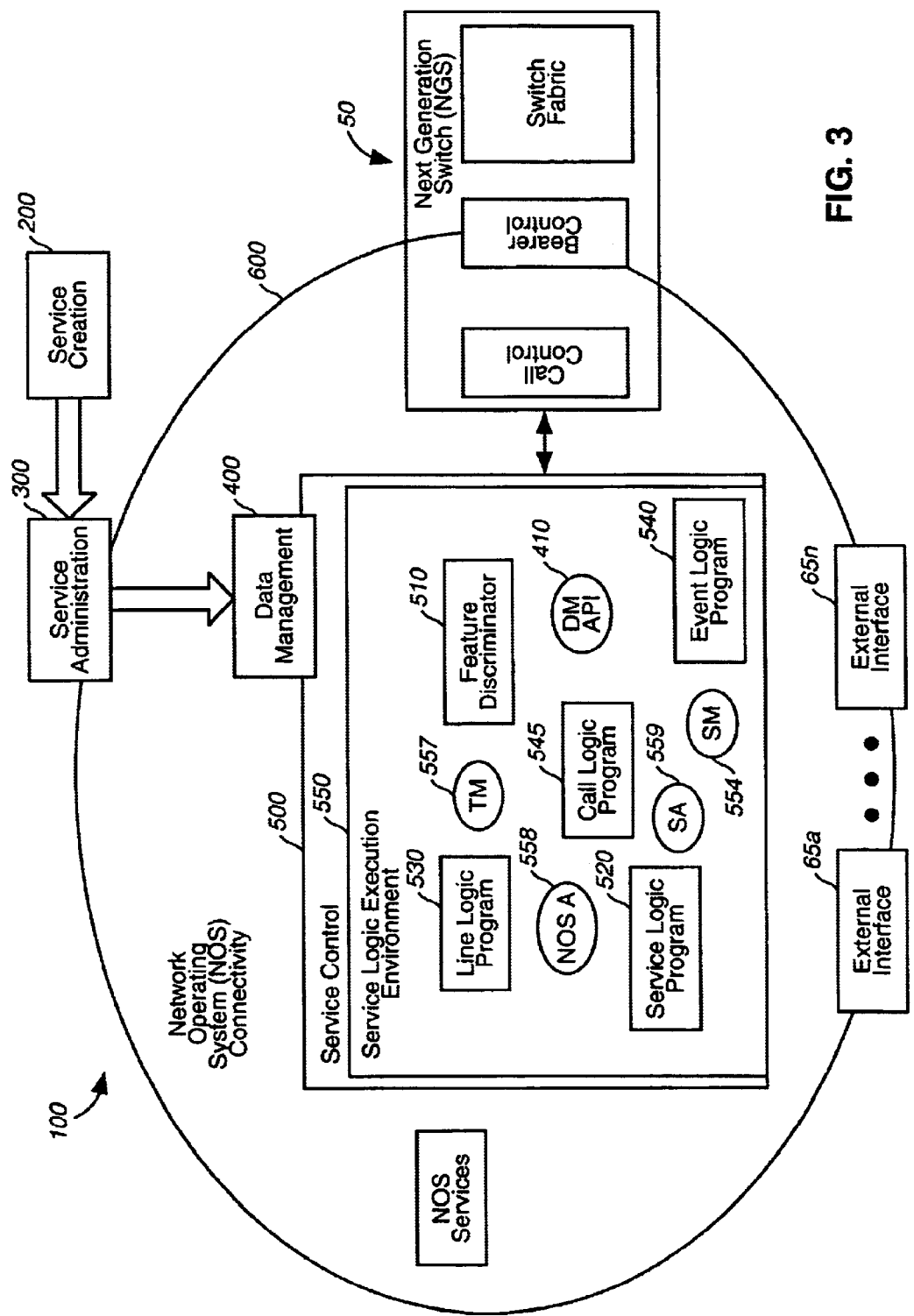
FIG. 3 illustrates the NGIN system architecture designed to perform both service life-cycle and service utilization functions.

FIG. 3 illustrates a more detailed functional architecture of the NGIN system 100. As shown in FIG. 2, the SCE component 200 of the NGIN system provides an environment for creating, building, and testing new services. As will be explained, it is a computing platform embodied, for example, as a Java application, that is portable and can execute on a variety of computers and operating systems to enable any user or system administrator to perform the following functions: 1) define a type of call service; 2) design that service with regard to features and methods performed and embody that service as a component or "package"; 3) create that service for a certain customer or set of customers, or for a certain number or set of numbers; 4) test that service; and 5) define where in the network architecture that service is to be deployed. In the context of the invention, operator "service" sand the call intelligent routing features associated therewith, is embodied as one or more software logic programs ("SLPs") that execute within the Service Control component 500 of NGIN. As will be described in further detail, the creation of SLPs involves the generation of Service-independent Building Blocks ("SIBBS") which are re-usable software modules preferably written in Java™ or other object-oriented, platform-independent computing language, that perform a low-level function related to call processing, in a manner that is generic and independent of a particular high-level service.

Additionally, as shown in FIG. 3, the Service Administration component 300 is that component of IDNA/NGIN that performs all of the functions needed to manage, store, and distribute, activate, deactivate and remove all services and service data used in NGIN and to configure both the hardware and software components at service nodes throughout the IDNA/NGIN system 100.

The Data Management component 400 functions in both a service life-cycle and service utilization capacity by providing the local data store and data management functions for each NGIN service node. This includes all types of data including: service programs and SIBBs, data for services (customer profiles, telephone numbers, etc.), multi-media files (such as audio files for Interactive Voice Response ("ICR") services), etc. Specifically, in the manner described in commonly-owned, co-pending U.S. patent application No. 09/421,590, filed Oct. 20, 1999, entitled METHOD AND APPARATUS FOR DEPLOYING SERVICE MODULES AMONG SERVICE NODES DISTRIBUTED IN AN INTELLIGENT NETWORK, the contents and disclosure of which is incorporated by reference as if fully set forth herein, the Data Management component 400 of a service node receives an extract of the Service Administration global repository or Database of Record ("DBOR") comprising all data needed for the services performed by the local NGIN service node as specified by Service Administration.

As further shown in FIG. 3, the Service Control component 500 of NGIN is provided with functions necessary for providing real-time intelligent call processing services, and is thus part of a service utilization aspect of the NGIN system. Specifically, provided within service control 500 is a Service Logic Execution Environment ("SLEE") 550 which functions as a virtual machine to provide an execution platform for NGIN call processing services independent of the hardware and operating system of the computer on which these processes are running. More particularly, the SLEE 550 enables the functional architecture of Service Control to be implemented on any general purpose computer, including a hybrid network of different types of computers and operating systems. In its preferred embodiment, the SLEE 550 is written in Java™ code, however, other platform-independent languages may be implemented. The SLEE 550 is designed so that Service Control services do not need to make calls to the computer's operating system, since operating system functions, such as data input/output, are performed by the NOS component 600 and Data Management component 400 which interface with Service Control services across the architecture, as will be described.

As shown in FIG. 3, the call processing services provided in Service Control 500 are implemented as logic programs that execute in the SLEE 550. Though logic programs are all written and executed in the same manner, they may be designed to perform different and certain functions related to event service processing. In the preferred embodiment, there are five different types of logic programs used to perform call processing and other supporting services: 1) Feature Discriminator logic programs ("FD") 510, which are functional sub-components that first receive a service request from the switching platform 50, determine which service to perform on a call based on some available criteria, for example, the dialed number of the call, and, then calls on another appropriate Service Logic Program to process the call; 2) Service Logic Programs ("SLP") 520, which are functional sub-components that perform service processing for a requested service; 3) Line Logic Programs ("LLP") 530, which are functional sub-components that maintain the current state of a network access line; 4) Event Logic Programs ("ELP") 540, to which all other logic programs write events; and 5) Call Logic Programs ("CLP") 545 which are functional sub-components that maintain the state of an entire call by providing a connection point for all other logic programs that are involved in the processing of a call. Each of these logic programs are embodied as a software "objects", preferably written in Java™ programming language, that may either be temporarily instantiated or persistent, as will be described. The NGIN service control architecture is designed such that these objects are written only once in Service Creation, and may be deployed to a Service Control SLEE on any type of computer and on any type of operating system anywhere in the network.

Furthermore, as described in commonly-owned co-pending U.S. patent application Ser. No. 09/420,654, filed Oct. 19, 1999, now U.S. Pat. No. 6,425,005, entitled "METHOD AND APPARATUS FOR MANAGING LOCAL RESOURCES AT SERVICE NODES IN AN INTELLIGENT NETWORK," the contents and disclosure of which is incorporated by reference as if fully set forth herein, other processes that execute within the SLEE 450 for support, service activation, and operational functions include: a Service Manager ("SM") object 554, responsible for loading, activating, de-activating and removing services that run in the SLEE, monitoring all other services running within its SLEE, and reporting status and utilization data to NOS; a NOS agent process 558 which is a NOS class library that is used for interfacing with NOS services and is used by all services running within that SLEE to call on NOS services, i.e., is the gateway to NOS; a thread manager ("TM") 557, which provides functionality needed for NGIN services to execute concurrently without tying up all the SLEE resources; and, a Data Management API ("DMAPI") 410 used to interface with the local cache and cache manager components of DM 400. As an example, a 1-800-number service having a SIBB that has collected 1-800-number digits, for example, may need to interact with the data management component to query a database to perform a number translation. This is accomplished through the DM API 410 which will perform the translation look-up and provide the data back to the service. As described herein, the database may have been previously loaded to the local cache or, the data is accessed from a local DBOR extract through a DM server (not shown).

Still other service instances loaded in the SLEE as shown in FIG. 3 include a Service Agent ("SA") instance 559 and a thread manager instance 557 associated therewith. As described in co-pending U.S. patent application Ser. No. 09/420,654, filed Oct. 19, 1999, now U.S. Pat. No. 6,425,005, as part of the service activation, whenever a request is made for a service, e.g., in response to a call event, that requested service's service agent instance 559 will get the location of the call from NOS, via the NOS agent 558, and will query its thread manager instance 557 to determine if there is another thread manager instance 557 to determine if there is another thread instance that could process that call. For example, a particular type of service may be allocated a predetermined number of instances, i.e., threads that may be invoked. The thread manager instance 557 will return a thread object (not shown) and clone an instance of that requested service (SLP) if the resources are available, or else will reject the call. If the new instance of the SLP is created, its code is executed inside the thread. It should be understood that during this instantiation, a unique transaction identifier or session i.d. is created to determine which instance of the thread corresponds to the received call. Moreover, call context data is managed by the thread. Besides assigning execution threads, the service agent collaborates with the thread manager to monitor these threads and determine overall system loads.

Further shown in FIG. 3 is the NOS component 600 which comprises a set of network-wide services that provides process interfaces and communications among the other NGIN functional components and sub-components. Among the services provided by NOS are object connectivity, logical name translation, inter-process communications, and resource management. The NOS component particularly encapsulates the location of any NGIN service from the processes that need services and data, so that a process only needs to make a call to a single logical name. The NOS 600 determines which instance of a service to use, and provides connectivity to that instance. The NOS 600 enables, in part, both the widely distributed nature of NGIN, and the platform-independence of NGIN. For example, the aforementioned logic programs use the NOS component 600 to call other logic programs, and can therefore call and invoke other logic programs that run on different SLEEs either in the same service node or a remote service node. Particularly, through SA, a service node may be specified to perform only certain services. When a call that arrives at an NGS switch 50 having an associated NGIN service node 45 for which the needed service may not be performed, e.g., joining a conference bridge, NGIN may need to route the call to another node configured to provide such service. Preferably, NGIN, via the NOS component 600, will call the needed service at another remote service node, perform the call processing, and provide a service response to the NGS switch at the original node.

Additionally provided as part of the service utilization aspect of NGIN are one or more external Interfaces 65a, . . . , 65n functioning as gateways to other systems and networks that NGIN must interface with, but that are not NOS-compliant. Examples of such systems and networks include line information database ("LIDB") and other data platforms that use SS7 signaling for communications, customer premise equipment that are used for call processing, Service Control Points (see FIG. 1), etc. A gateway adapts communications messages sent to and from an NGIN component using NOS, to whatever communications protocol is used by an external component.

Figure 4A:
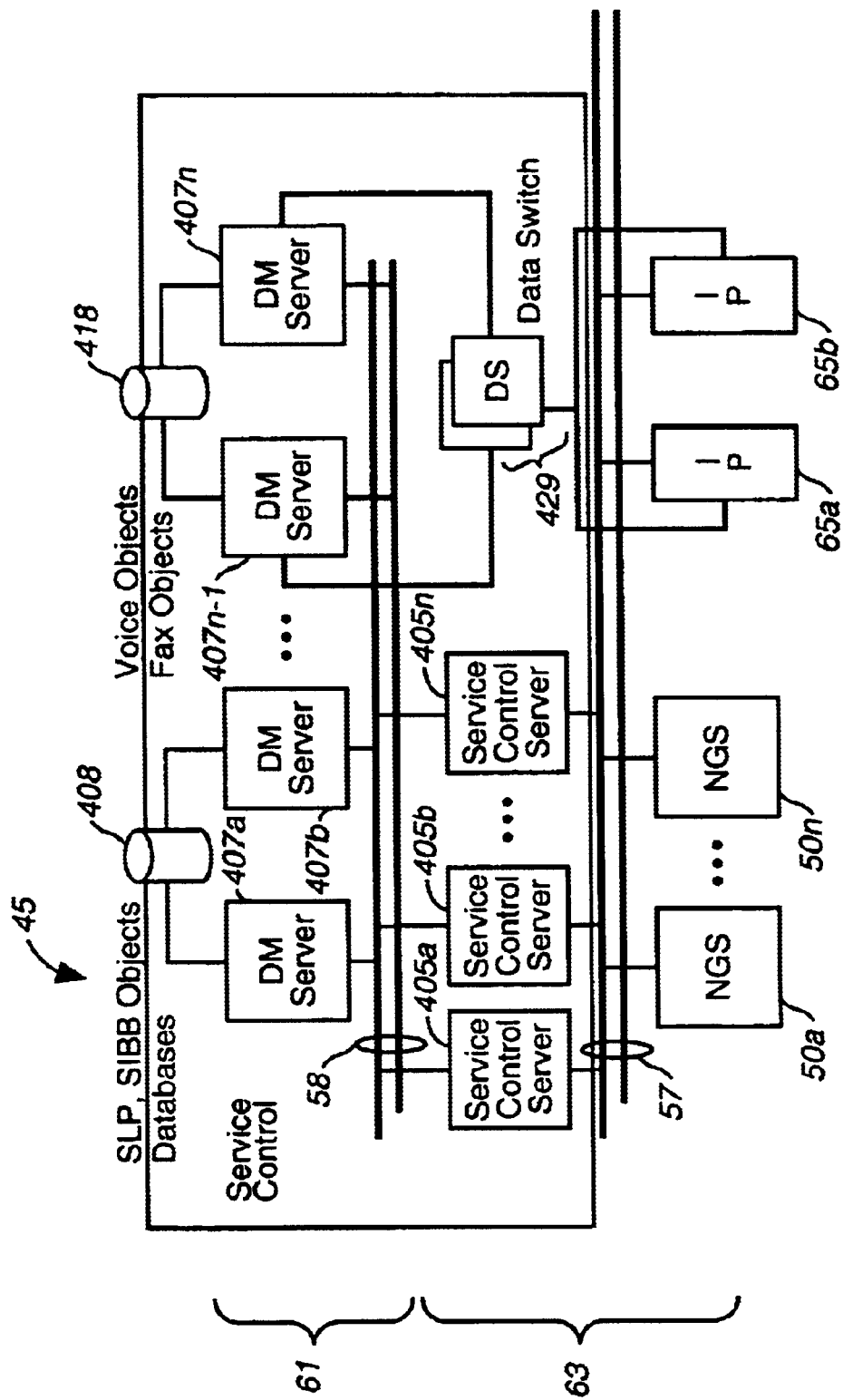
FIG. 4(a) illustrates a physical architecture of an example NGIN service node.
Figure 4B:
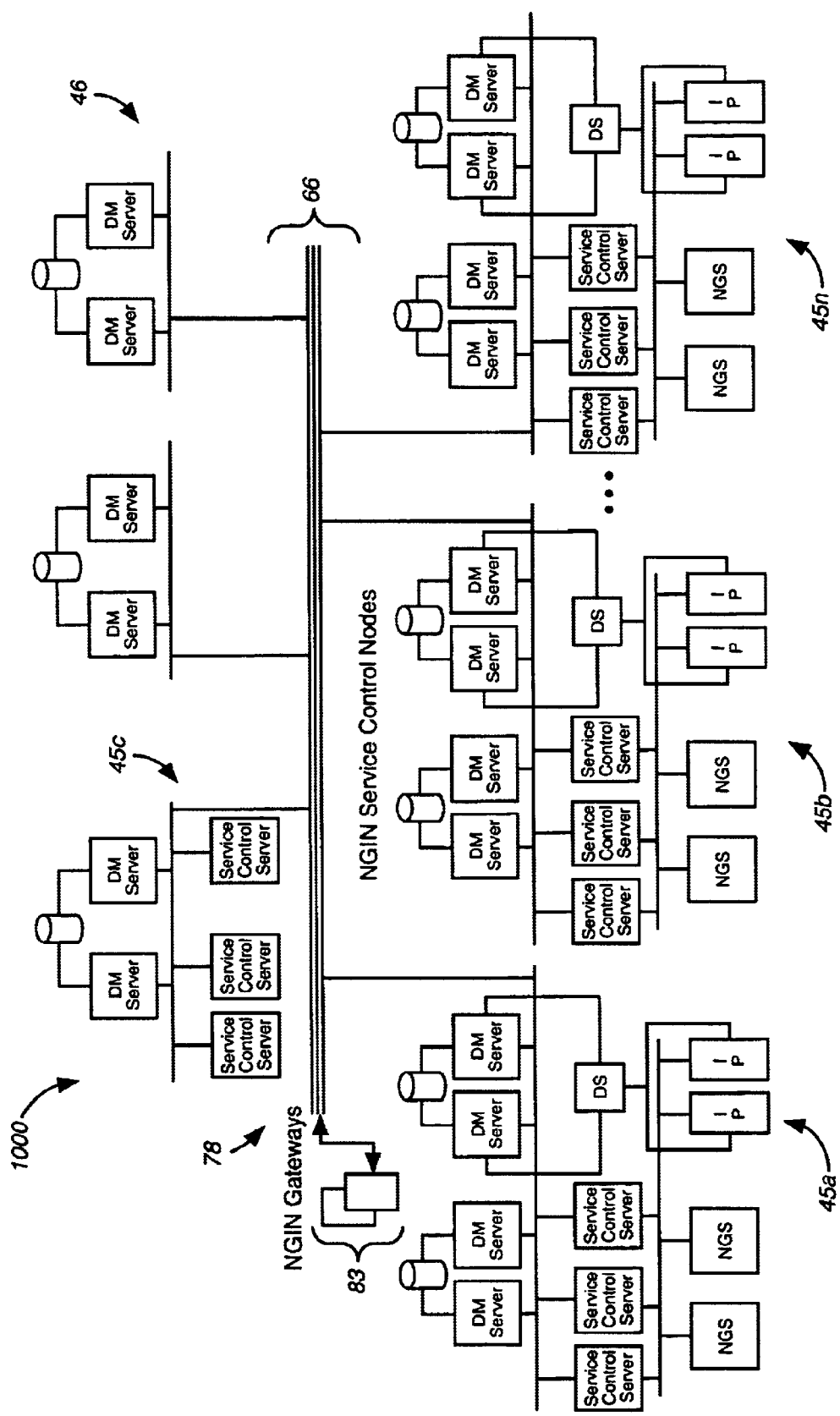
FIG. 4(b) illustrates an example physical architecture of the NGIN domain.

As will be described herein in reference to the physical architecture depicted in FIGS. 4(a) and 4(b), the NGIN service control 500 and data management 400 components are deployed in one or more service nodes or "sites" 45 which typically perform intelligent services. The NOS component 600 provides the functional interfaces, and is resident within each component.

Figure 5A:
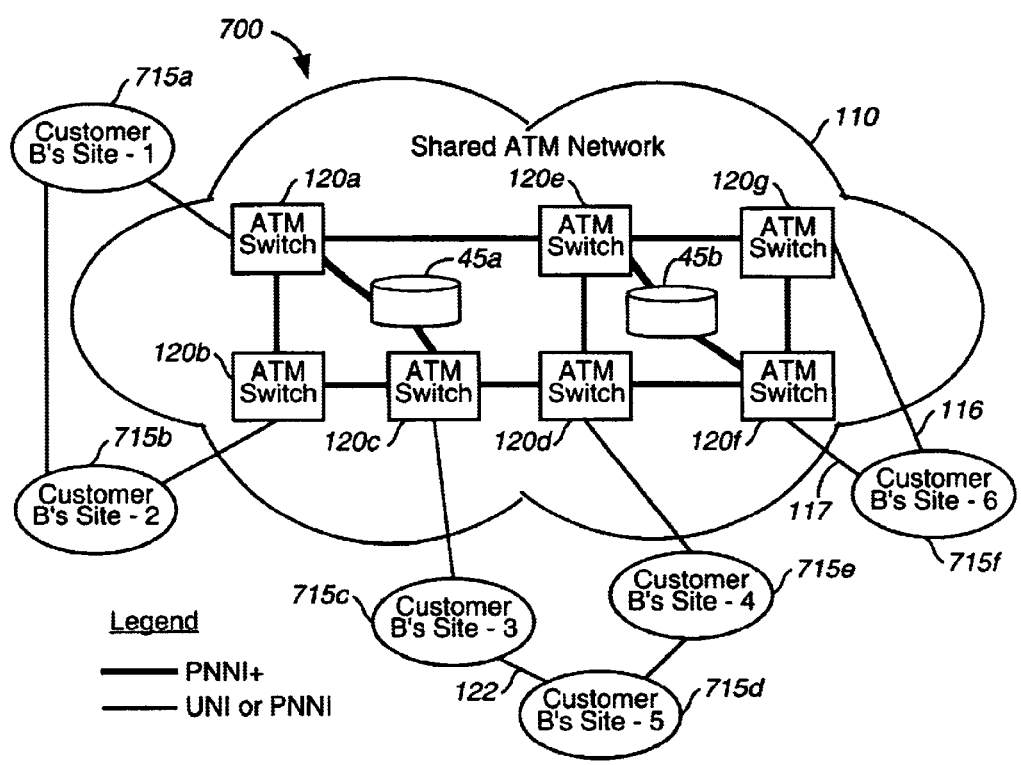
FIG. 5(a) illustrates the basic components of the ATM Virtual Private Network (VPN) Architecture supported by the NGIN architecture of the invention.

The ATM Virtual Private Network (VPN) Architecture 700 depicted in FIG. 5(a) comprises customer sites, e.g., 715a–715f, resource complexes comprising ATM switches 120a–120g, for example, and the NGIN service nodes, two of which nodes 45a,b having an NGS resource complex capable of receiving ATM call events and one or more NGIN service control components (e.g., service control servers executing SLEE's) being provided. Particularly, the SLEEs at each service node execute SLPs for providing Vnet/VPN services over the ATM network, for example and particularly implement ATM shared network functionality as described in commonly-owned, co-pending U.S. patent application Ser. No. 09/128,495 entitled ATM VIRTUAL PRIVATE NETWORKS, the contents and disclosure of which is incorporated by reference as if fully set forth herein. It should be understood that the SLEEs execute SLPs for providing Vnet/VPN services over traditional circuit-switched networks, as well.

In the preferred embodiment, the NGIN system 100 provides ATM and Virtual Private Data Network Services such as: 1) Source Address Screening providing security for a customer's virtual private data network by preventing a caller from placing a calls to prohibited destinations, e.g., to prevent customers from making calls outside of their network; and, to provide internal segmentation of their network, i.e., preventing particular sources from calling particular destinations. With this type of screening, a source is associated with an inclusion or exclusion list of destinations, e.g., provided in a local DM cache, which is checked prior to attempting to complete the call; 2) Destination Address Screening for providing a similar type of security by allowing subscribers to prevent calls from being delivered to destinations. This feature is used in a similar manner as source screening to protect the integrity of a private network with customers using this feature to provide secure access to a particular destination within their network. With this type of screening, a destination is associated with either an exclusion or inclusion list and these lists may be checked before allowing a call to be presented to that destination; 3) Closed User Groups for defining a virtual private data network for customers. Calls placed from within the closed user group may only be connected to destinations that are also within the closed user group.

Additionally NGIN supports ATM call center capability including, but not limited to the following call center applications: 1) Time of day routing wherein the address specified (either E.164 or as an ATM end System Address format) in the "Setup" or "Add Party" signaling message may be modified to a different address depending upon the time of day that call was placed; 2) Day of week routing wherein the address specified (e.g., in E.164 or as an ATM end System Address format) in the "Setup" or "Add Party" signaling message may be modified to a different address depending upon day of the week that call was placed; 3) Percentage allocation wherein the address specified in the "Setup" or "Add Party" signaling message may be modified to a different address depending upon the percentage of calls that are allocated to go to that address; 4) Contingency routing plans wherein an alternate ATM routing plan may be defined by the customer to be used in the event of a major change in the availability of call center resources at a particular destination. For example, a customer may have a normal routing plan that does time of day routing, day of week routing and percentage allocation routing to three call centers. If one of those centers is shut down unexpectedly, the customer may have elected to define an alternate routing plan that accounted for the situation; 5) Point of origin routing wherein the address specified in the Setup or Add Party signaling message may be modified to a different address depending upon point of origin for the call; 6) Call parking wherein when the address specified in the Setup or Add Party signaling message (e.g., E.164 or as an ATM end System Address format) is currently unavailable, the network may need to park the call until the destination becomes available or a time limit for the park expires. If the destination becomes available, the call setup will proceed. If the destination does not become available before the expiration of the park, the call may be dropped or sent to an alternate destination; 7) Routing based upon settings in the AAL parameters wherein the Setup and Add Party signaling messages allow the specification of user defined parameters. It may be possible to use these parameters to specify a particular type of destination. For example, if the caller dials a well known number for a video operator, they might be able to specify a need for a Spanish speaking operator, for instance.

Additionally NGIN supports ATM one number services capability including: 1) Find me/Follow me wherein given an address that is assigned to a particular subscriber, that subscriber may change the destination associated with that address. The feature that would be provided with this capability enables a subscriber to receive calls as they move locations; and, 2) Alternate routing wherein if a destination is unavailable, it is possible to specify an alternate destination.

Billing services are additionally supported including the use of the ATM Adaptation Parameters enabling the specification of an account code to which a call should be charged; and, subscription control for quality of service which feature allows for the enforcement of subscription levels for subscribers. That is, if a subscriber signs up with an ATM network provider, they may pay a charge associated with a particular quality of service. When a Setup or Add Party message is sent from that subscriber, the quality of service parameters associated with that message are verified against the subscription for that subscriber; and, Source address validation which feature provides verification that the source address specified in a Setup or Add Party message is correct and is authorized for use on the incoming port. This provides for the assurance that the billed party is actually the one making the call.

Figure 5B:
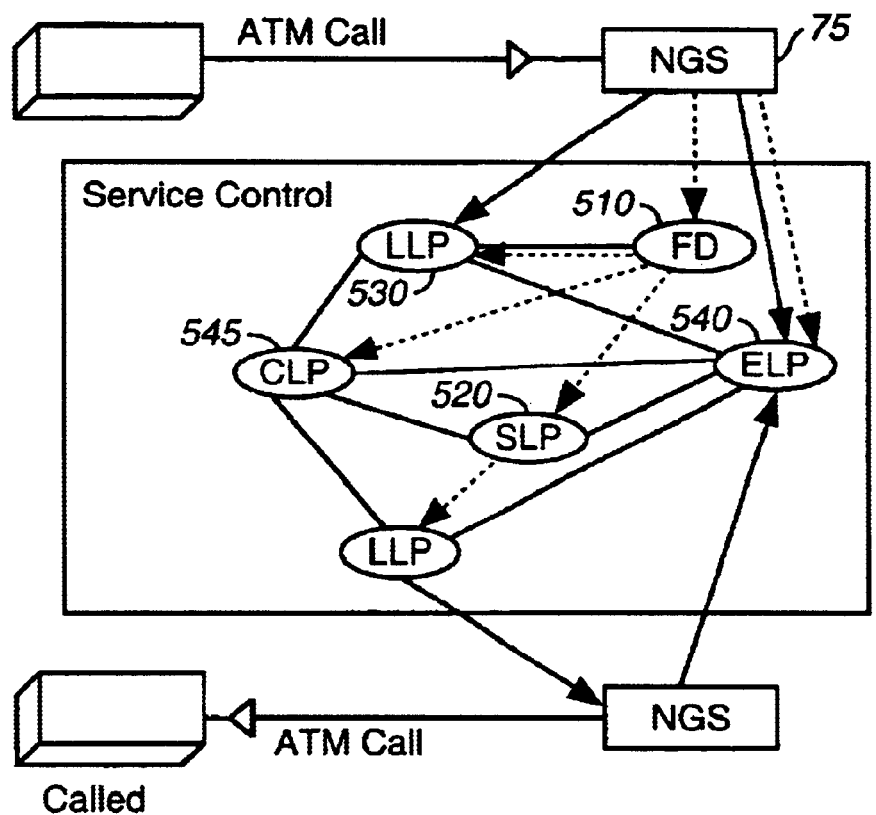
FIG. 5(b) illustrates a Vnet call processing scenario as serviced by NGIN.

In the context of ATM Vnet services ("ATM/Vnet"), a processing and service utilization scenario is now described for exemplary purposes, with reference to the functional diagrams of FIGS. 5(a) and 5(b) and the flow charts of FIGS. 6(a)–6(i). First, as shown at FIG. 5(b), an ATM/Vnet call event first arrives at the NGS switch fabric 75 of the NGS 50. This is depicted at step 121, in FIG. 6(a). When the NGS 50 receives a call, the bearer control component 80 (FIG. 2) provides the call control component with the access line on which the call was received, as well as the Vnet #, ANI, line ID, Network Call ID, originating switch trunk, and other data needed for call processing. The NGS Call control 90 maintains a state model for the call, as executed in accordance with its programmed logic. Additionally included in the state model are triggers for instantiating an ELP 540 and sending a service request to a FD 510 as shown in FIG. 5(b). To instantiate an ELP, the NGS call control component 90 addresses a message to NNOS, using a logical name for an ELP, as indicated at step 123, in FIG. 6(a). The NNOS, in response, sends a message to a Service Manager object (FIG. 6(a)) to instantiate an ELP within a SLEE and returns an object reference for that ELP back to call control, as depicted in step 126. The NGS call control component includes this object reference in a service request message that is sent to an FD in the SLEE, as indicated at step 129. Thus, all qualified event data that are generated for the call by any process are written to the instantiated ELP process. Particularly, the service request message is addressed to a logical name for FD; this logical name is translated by the NNOS NT component to a physical address for an FD logic program that is running at the same service node on which the call was received. Included in the service request message is the Vnet #, ANI, and other data.

Next, as indicated at step 131, the FD uses its feature discrimination table to identify which SLP is to handle the received service request. For the example Vnet service request, it is to be handled by the ATM_Vnet_SLP. Table 1 below is an example abbreviated FD table having entries including pointers to various "Vnet" call services.

Entry Port Table
  "001001" SLP pointer 'ATM_Vnet'
  "001002" Table pointer to FGD table
  FGD table
    Vnet1* table pointer Vnet1 table
    Vnet2* table pointer Vnet2 table
    Vnet3* table pointer Vnet3 table
  Vnet1 table
    Vnet SLP pointer to 'ATM_Vnet_SLP' where FGD is the feature group discriminator. Particularly, based on where the call originated in the network (switchboard) and the type of call received, the FD will determine an appropriate SLP logical name. For instance, the identification "0010021" indicates receipt of a call requiring a look-up in the FGD table (pointer to FGD table). The FGD table in turn, maintains pointers to other tables depending upon the called number, e.g., Vnet* where '*' is a delimiter. From this Vnet table, for example, the FD obtains a pointer to the requested SLP logical name which is to be invoked and, the service request is handed off to NNOS which instantiates a CLP 545, LLPO 530 and the SLP 520 objects according to the ATM/Vnet service requested. It should be understood that instantiation of these objects requires implementation of the NNOS LRM function which determines the best available instance based on the variety of factors as discussed, e.g., local SLEE loads. For instance, with respect to the LLPO, a logical name for the LLPO is provided to NNOS based on the bearer control line on which the call was received. Identification of this line is based on either the ANI or the access line identified by the NGS bearer control component 80. The ANI identifies the original access line that originated the call, which may or may not be the same access line on which NGS receives the call, i.e., the received call may have originated on a local network, for example, and passed to switch fabric 75 (FIG. 2) on an inter-exchange carrier network. Therefore, features associated with a line, such as call waiting or call interrupt, may be identified by the ANI. The NNOS translates the logical name for the LLPO to a physical address for an LLPO instantiation. While other logic programs (such as SLPs) may be instantiated at other sites, the LLPs are instantiated at the site at which their associated lines are. Once instantiated, the LLPO queries Data Management for features associated with the line, maintains the state of the originating line, and will invoke any features such as call waiting or overflow routing when those features are invoked by the caller (i.e., call waiting) or network (i.e., overflow routing). In the ATM/Vnet context, the LLP may request from the DM whether the line is able to handle ATM calls with the specified bandwidth.

Figures 6A, 6B:
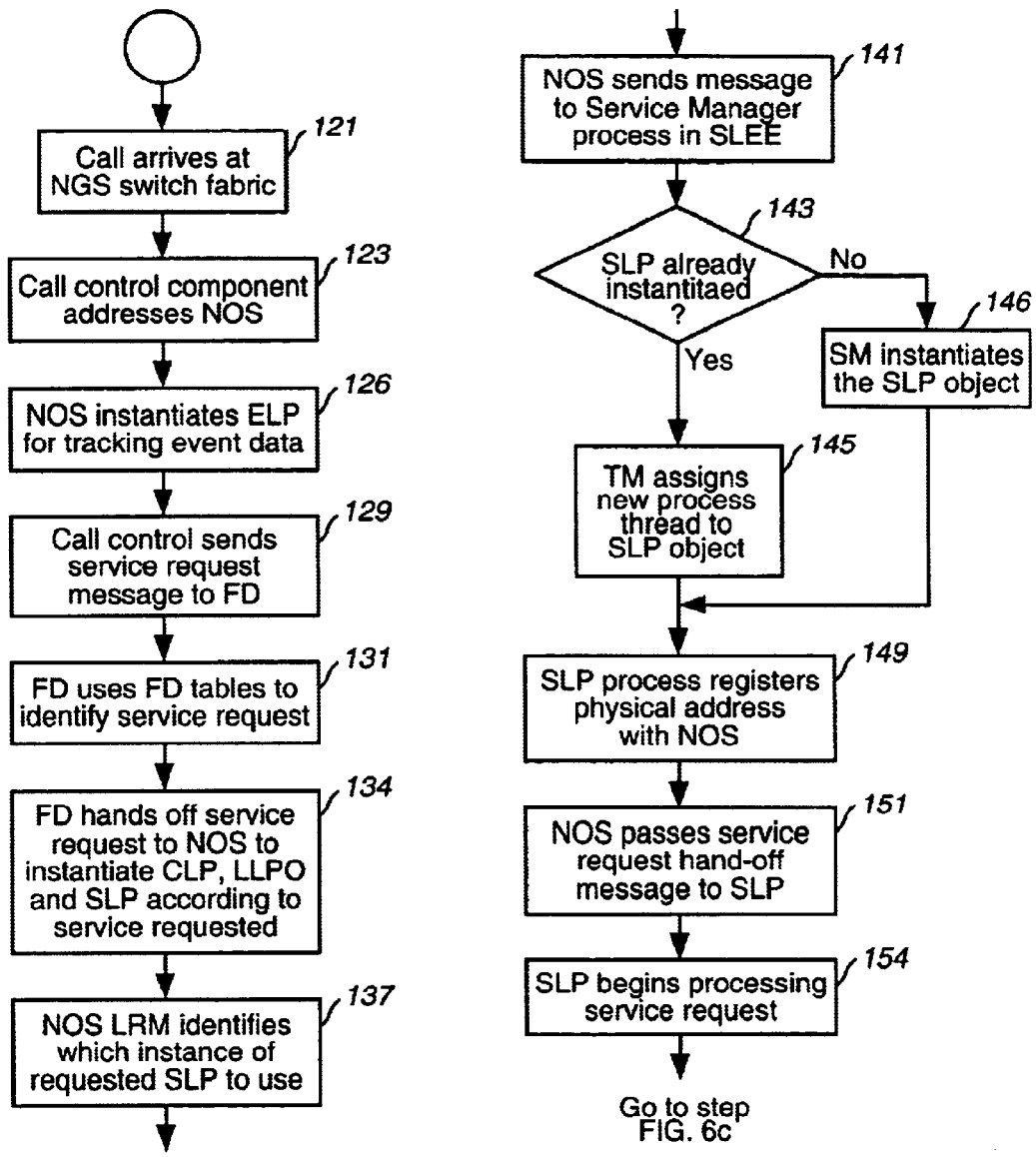
FIGS. 6(a) and 6(b) illustrate flow diagrams depicting the service utilization phase of the NGIN system.

Referring to step 134, FIG. 6(a), the NNOS receives a service request hand-off request from the feature discriminator containing the logical name representing the particular service to be invoked, e.g., ATM_Vnet. The NNOS identifies that the request contains a logical name and looks in its instance tables (not shown) to determine whether it has any SLP processes available to service this service request. It also identifies through the NNOS LRM function which instance of the requested type to use, as indicated at step 137. Thus, as indicated at step 141, FIG. 6(b), NNOS sends a request to the Service Manager object running on a Service Control SLEE to invoke the requested Vnet service if it has not already been instantiated. In the preferred embodiment, NNOS selects the SLP from a Service Control server that received the original incoming service request notification from the NGS, however, it is understood that NNOS could select the SLP in any service control component through implementation of the NNOS LRM function and based on its list of Service Control instances and their current status. As indicated at step 143, FIG. 6(b), NNOS determines whether the selected SLP is already instantiated and if the selected SLP is not already instantiated, will direct the SM to instantiate the SLP object, including an ATM_Vnet service agent object which initiates a thread as indicated at step 146. Otherwise, if the selected SLP is already instantiated, the thread manager assigns a new process thread to the SLP object, as indicated at step 145.

The next step 149 of FIG. 6(b) requires that the instantiated ATM_Vnet SLP registers its physical address with the NNOS, and that the NNOS allocates this SLP to the service request. Then, the NNOS passes the service request hand-off message to the new ATM/Vnet SLP instance, as indicated at step 151, FIG. 6(b). Included in the service request hand-off message is the pertinent Initial Address Message ("IAM") information, including information such as: the time that the service request is initiated; the Switch ID that the request is originated from; the Port ID from which the call originated; the terminal equipment ID from which the call originated; the calling party's number; and the called party's number. Additionally included in the IAM message are the requested ATM setup parameters including: the requested bearer capability, traffic parameters, and optimally ATM Quality of Service (QoS) parameters, etc. This information is used to determine if the ATM/Vnet call may be routed based on the state of the network and the subscriber's user profile. In addition to receiving the IAM message, the NNOS sends to the instantiated CLP all service related data, including object references for the instantiated SLP, ELP, and LLPO objects. Object references for the CLP and ELP are also provided to the LLPO and the (ATM/Vnet) SLP, so that the LLPO and the SLP may interface with the CLP and the ELP. Finally, as indicated at step 154, the ATM/Vnet SLP then begins processing the call in accordance with its programmed logic.

Figure 6C:
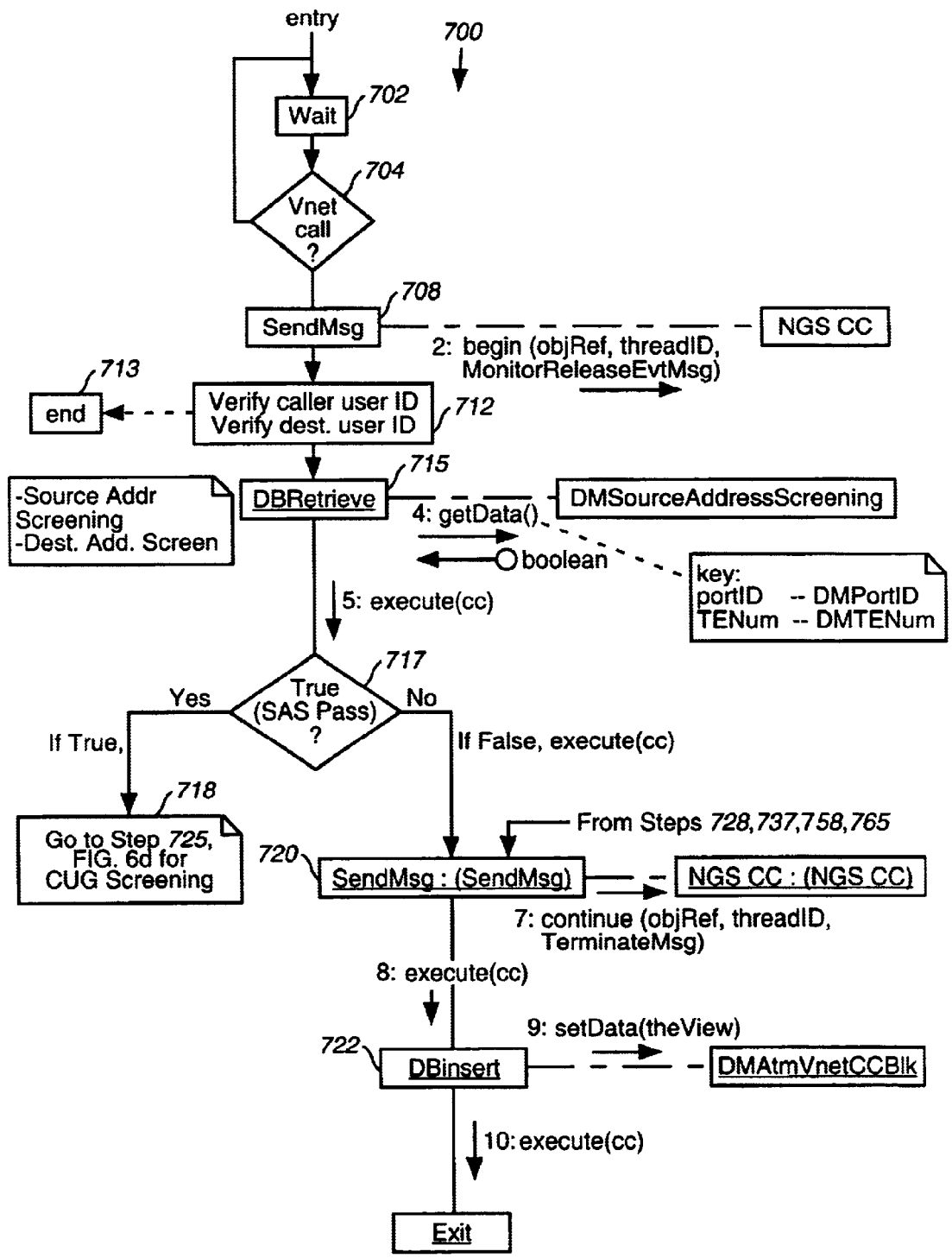
FIGS. 6(c)–6(i) depict a flow diagram illustrating a basic ATM/Vnet call service process implemented in NGIN.

In the context of the ATM/Vnet call, the ATM/Vnet SLP 520 preferably queries and obtains the necessary data from one or more ATM/Vnet databases (not shown) to make an appropriate decision. As shown in FIGS. 6(c)–6(i), the ATM/Vnet SLP 520 invokes the following steps:

Assuming an ATM_Vnet_SLP service thread 700 has already been instantiated, the first step 702 in FIG. 6(c) is to remain idle until a Vnet service request event message is received either from the FD or directly from NGS, and, at step 704, to determine whether a received call is a Vnet call. As described, a (ServiceRequestEvent) class is instantiated having methods responsible for conveying an initial service request from NGS to NGIN. Preferably, a SIBBWait.java class (SIBB), an example of which is provided in Appendix A, is invoked to wait for the ATM/Vnet call and to extract information from a service request event into a call context object associated with the Vnet call instance, when it is received. Preferably, the call context object implements put( ), get( ), and remove( ) instance methods for manipulating key-value pairs in a hashtable array for storing information relating to a particular call.

Next, as indicated at step 708, once a message relating to the ATM/Vnet call is received, the SLP Vnet process sends a MonitorReleaseEvent message to the NGS along with a call identifier, e.g., thread id and SLP object reference. This may be accomplished by invoking a SIBBSendMsg.java (SIBB), an example of which is provided in Appendix B, which may be used by SLPs to communicate messages Particularly, the MonitorReleaseEvent message is a public class extending base class NGINEvent and is used to inform the NGS that if it should receive a release indication, e.g., from the call originator, it should be forwarded to NGIN.

Then, as indicated at step 712, a determination of the originating Vnet user id is made. This entails invoking a SIBBDBR.java (SIBB), an example of which is provided in Appendix C, to perform a database query for verifying whether there is an originating user ID associated with the calling number. If there is no originating user ID associated with the calling number, then the process terminates, as indicated at step 713 and an appropriate message is sent to NGS that the originating user ID was not found. If the originating user ID is found, then a similar process is invoked to determine the destination user ID. If the destination user id is not found, then the appropriate indication is sent to NGS that the destination user ID was not found and that the call should be terminated, as indicated at step 713.

If the destination user id is found, then a source address screening ("SAS") function is performed, as indicated at step 715, FIG. 6(c). Particularly, the ATM_Vnet SLP initiates a database query to validate the source address and, to verify that the ATM setup IAM message traffic and service level parameters fall within the limits of the customer's subscription. To accomplish this, the source address screening procedure is invoked via the SIBBDBR.java method (Appendix C) to return a boolean indicator verifying whether the portID and terminal equipment ID of the originating call message corresponds to the proper user ID. This is performed to prevent transfer of data in the Vnet network by unauthorized callers. Implementation of the SIBBDBR.java method to provide source address screening includes the following steps: 1) the ATM_Vnet SLP requests the Source Address database name from NNOS NT; 2) NNOS NT requests the actual Source Address database name from DM; 3) DM sends the actual Source Address database name and its stored locations to NNOS NT; 4) NT queries the LRM function to find out if the Source Address database is available locally and the NNOS LRM returns the physical database address to NT; 5) NNOS NT passes the Source Address database physical address to the ATM_Vnet SLP; 6) the ATM_Vnet SLP queries DM to determine if the Source Address is valid and if the specified bandwidth in the setup message matches the customer's subscription. It is assumed that the setup message parameters (e.g., bandwidth) are validated against the customer's subscription versus the current network utilization. Finally, the DM returns a boolean response to the ATM_Vnet SLP query.

As shown in FIG. 6(c), step 717, if a false is returned, i.e., SAS test fails, then the process terminates. As indicated at step 720, this involves sending a terminate message (TerminatEvent.java) to the NGS via the SIBBSendMsg.java to initiate the tear down connection process. At this point, any accumulated call context data pertaining to this call is stored in the call context object or database for subsequent use, as indicated at step 722, and the process terminates. It should be understood that, at various times throughout the ATM_Vnet_SLP process, as indicated in FIGS. 6(c)–6(h), call context data is written to a call context object, e.g., the instantiated ELP, and/or a database structure so that a proper callrecord is maintained, as indicated by the "execute(cc)" call. As indicated at step 722, a SIBBDBInsert.java (SIBB) is executed to allocate storage in the DM (database) and write to the database the call context data accumulated for the call.

If the SAS is successful and a boolean true value is returned as determined at step 717, then, at step 718, FIG. 6(c), the ATM_Vnet_SLP performs a Closed User Group screening ("CUGS") procedure to verify whether the originating user ID may place the call to the called destination. Instead of or prior to performing CUG screening, it should be understood that a Destination Address Screening may be performed for verifying that the destination address is a valid termination for the originator of the call.

Figure 6D:
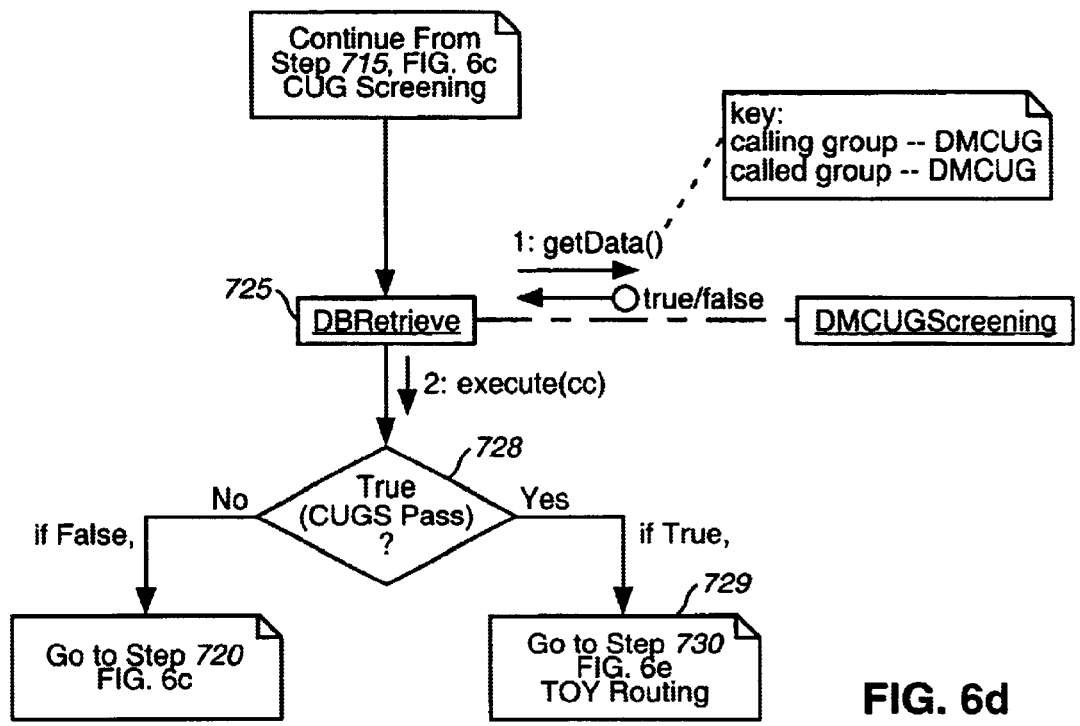

As depicted in FIG. 6(d) the CUGS process includes a first step 725 for performing a database query in the DMCUGScreening database by implementing SIBBD-BR.java. As a result of the query, a boolean result is returned indicating that the caller ID is part of a calling group having authorization to call the destination which is part of a called group. Thus, at step 728 a determination is made as to whether the boolean result returned is true indicating that the CUGS is successful. If the step is not successful, i.e., fails CUGS test, then the process returns to step 720, FIG. 6(c), to perform the termination procedure including sending a message to NGS via the SIBBSendMsg.java to initiate the tear down connection process and, writing the accumulated call context data to the allocated database structure.

If the CUGS is successful, and a true is returned at step 727, then, at step 729, FIG. 6(d), the Vnet SLP performs a Time of Year Routing ("TOYRouting") procedure to obtain the routing plan choice depending upon the current time the call is placed.

Figure 6E:
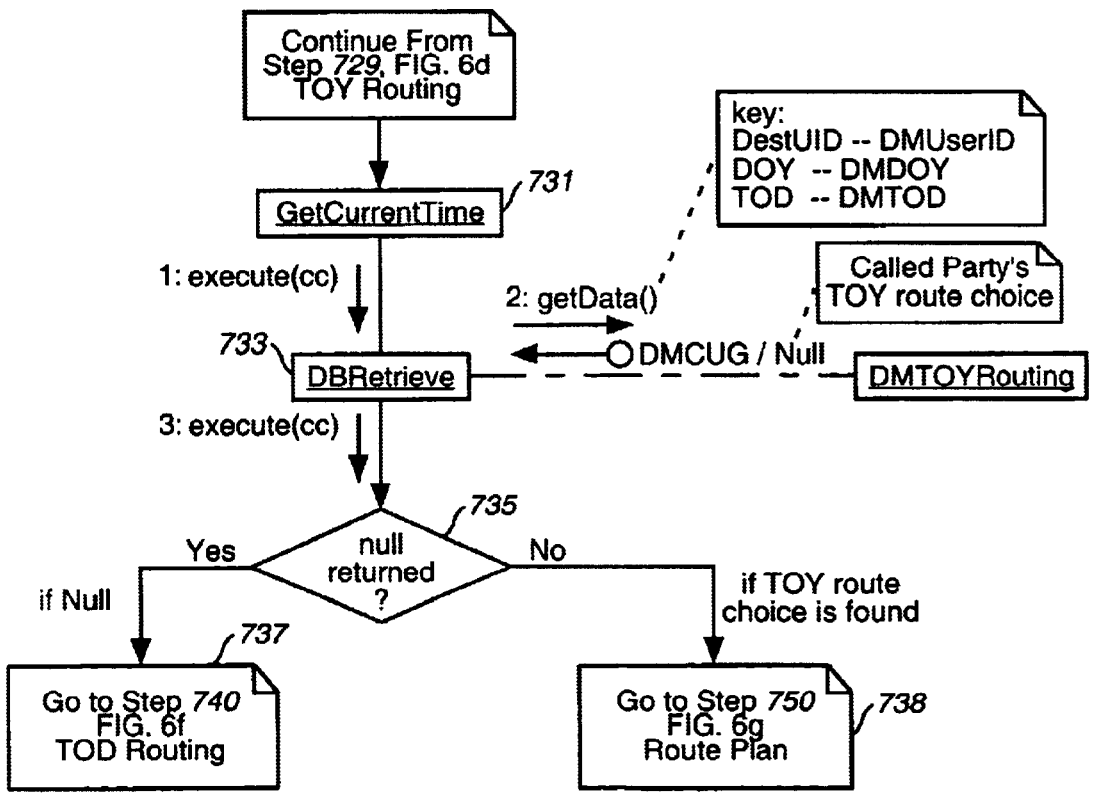

As depicted in FIG. 6(e), the TOYRouting process includes a first step 730 of obtaining the current time which includes invoking a SIBBGetTime.java class, an example of which is provided in Appendix D, to obtain the current time from the NNOS service. Then, as indicated at step 733, a database query is performed in a TOY Routing database using the Destination UserID, the current time of day and time of year values by invoking the SIBBDBR.java class to retrieve the called party's preferred routing choice or, a null indication, indicating no routing preference. Thus, at step 735, a determination is made as to whether the result returned is null indicating no called party TOY routing preference. If there is a preference, then the route choice associated with the route plan is implemented, as indicated at step 738.

It should be understood that, in the context of an ATM to ATM call, no number translation need be performed. For other types of Vnet calls, however, if a number translation is required, the ATM_Vnet process requests that NNOS return an object reference to the Vnet number translation database provided by DM. Once the SLP receives the location of the database, a database query is performed to lookup the physical address associated with the logical destination Vnet number and DM returns the physical address. Accordingly, a terminating profile is used to determine if the destination address can handle ATM and the specified bandwidth. The Vnet number translation may then be written to the ELP instance for placement in DM's allocated call context database.

Returning back to FIG. 6(e), if, at step 735, if a null is returned indicating no preferred TOYRouting route choice, then the process continues at step 737, FIG. 6(e), where the ATM_Vnet SLP performs a Time of Day Routing ("TODRouting") procedure to obtain the routing plan choice depending upon the current time the call is placed.

Figure 6F:
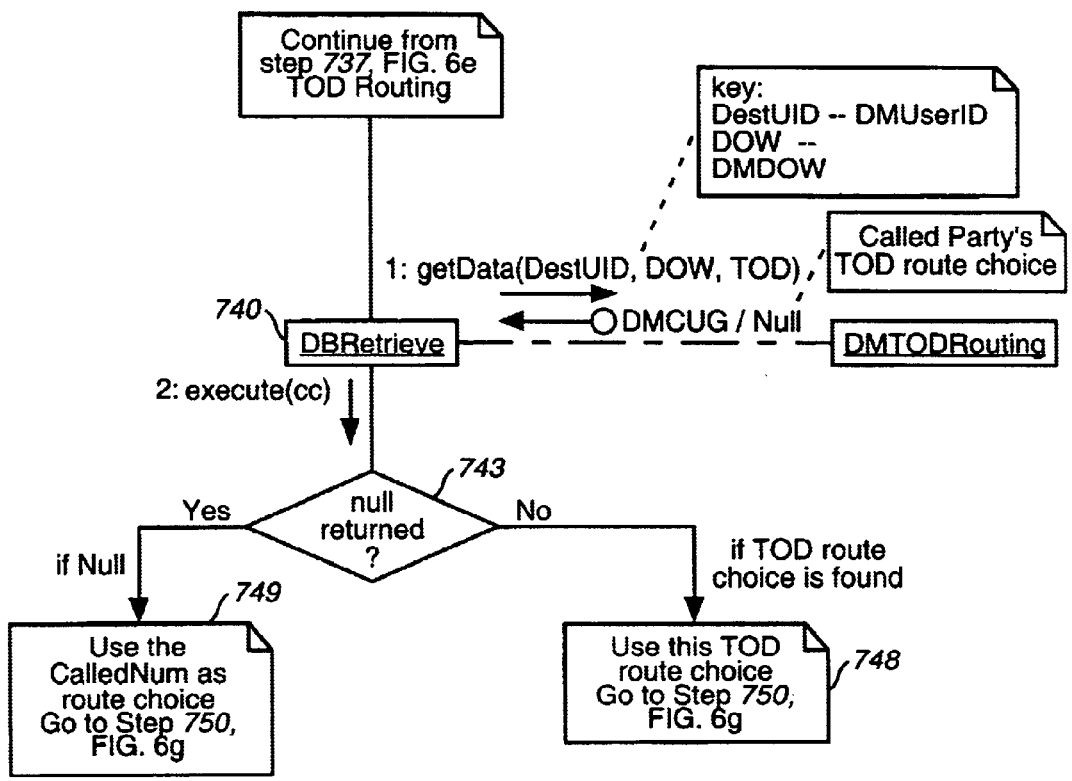

As depicted in FIG. 6(f), the TODRouting process includes a first step 740 of performing a database query in a TOY Routing database using the Destination UserID, the current day of week and time of day values as keys and invoking the SIBBDBR.java class to retrieve the called party's preferred routing choice or, a null indication, indicating no routing preference. Thus, at step 743 a determination is made as to whether the result returned is null indicating no called party TOD routing preference. If there is a preference (no null returned), then the TOD route choice associated with the route plan is implemented, as indicated at step 748, FIG. 6(f).

If, at step 743, it is determined that there is no TODRouting route choice returned, then the process continues at step 749, FIG. 6(f), where the ATM_Vnet SLP initiates routing of the call based on the called number.

Figure 6G:
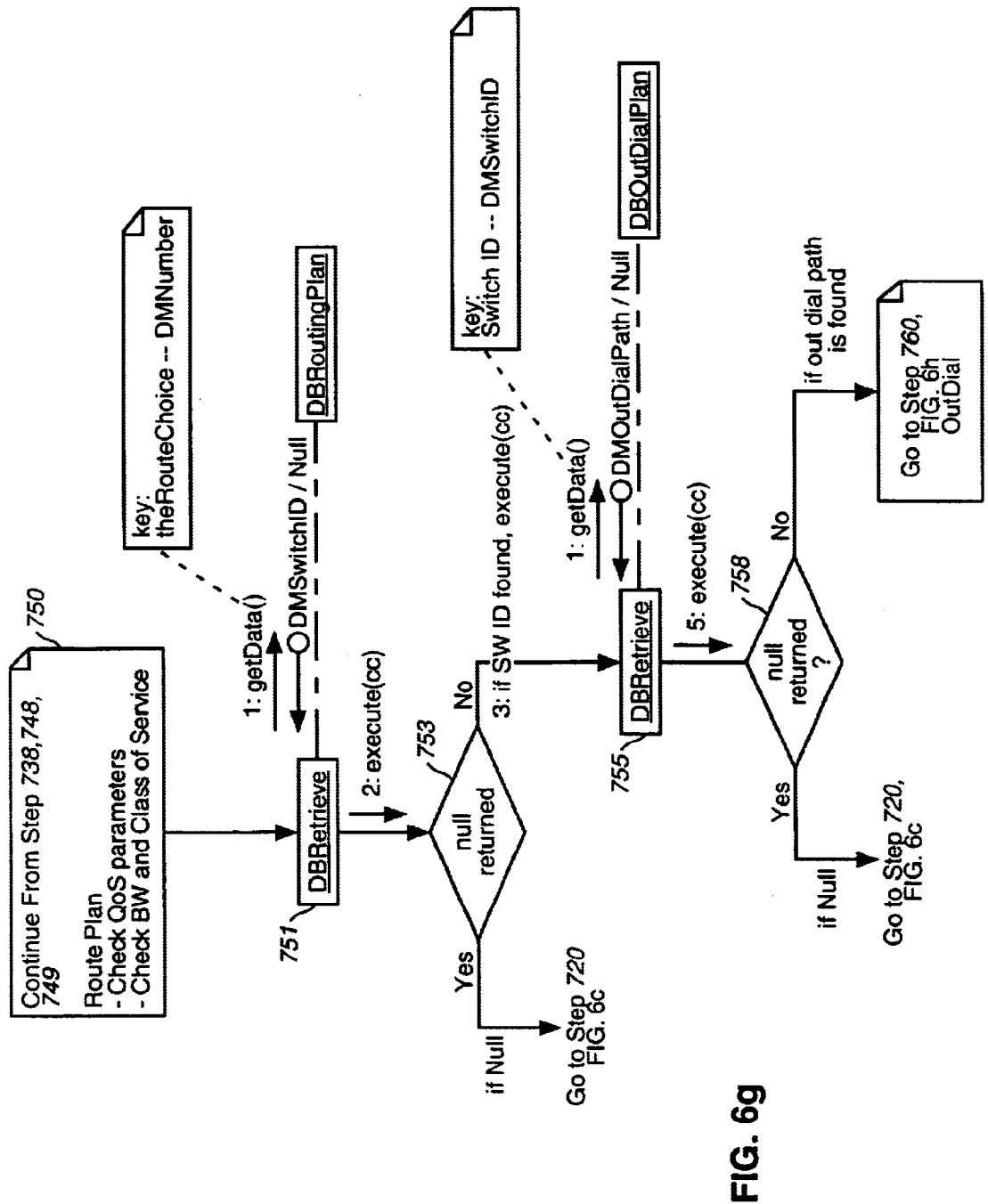

Referring now to step 748, FIG. 6(f) and, step 749 (FIG. 6(f), once a route choice is ascertained, the ATM_Vnet_SLP performs a process for determining which switch the call should be sent to based on the routing choice. Thus, as depicted in FIG. 6(g), the next step 751 is to perform a database query in a routing plan database using the route choice as a key and invoking the SIBBDBR.java class to retrieve the called party's preferred routing plan, in the form of a Switch ID, or a null indication, indicating no Switch ID found. Thus, at step 753 a determination is made as to whether the result returned result indicates a switch ID found and that the call may be routed. If there is no switch ID found, the process proceeds to step 720, FIG. 6(c) to send a message to NGS via the SIBBSendMsg.java to initiate the tear down connection process and writing the accumulated call context data to the call context object and/or database structure.

If, at step 753, a switch ID is returned, then the process continues to step 755, to determine an Outdial path, i.e., a trunk ID associated with the switch and the routing plan choice. Thus, in FIG. 6(g), the next step 755 performs a database query in an Outdial Plan database using the Switch ID as a key and invoking the SIBBDBR.java class to retrieve the outgoing trunk from the switch, or a null indication, indicating no trunk is available. Thus, at step 758 a determination is made as to whether the returned result indicates an outgoing trunk found and that the call may be routed.

If at step 758 it is determined that there is no outgoing trunk found, the process proceeds to step 720, FIG. 6(c) to send a message to NGS via the SIBBSendMsg.java to initiate the tear down connection process and write the accumulated call context data to the call context object and/or database structure.

Figure 6H:
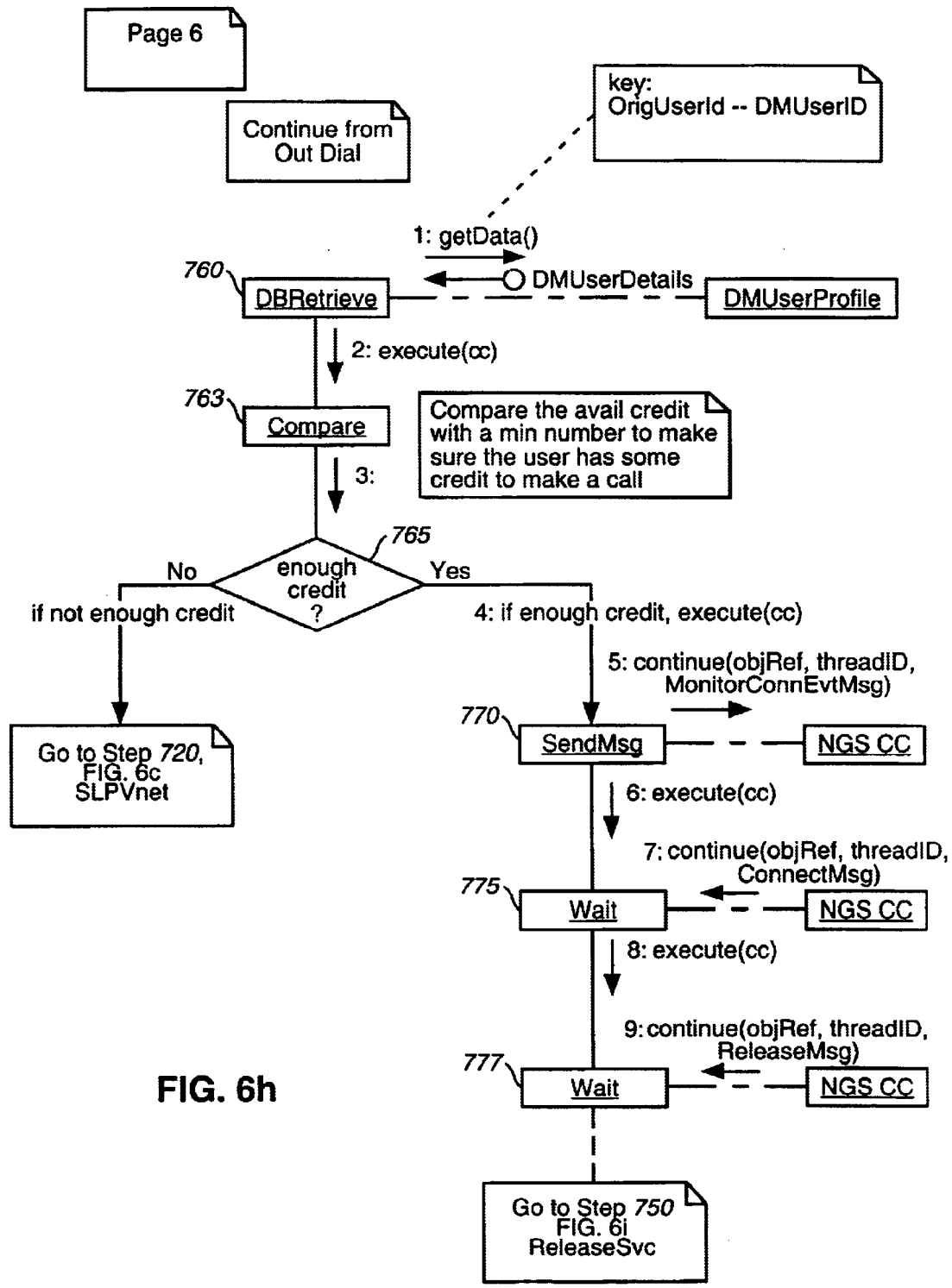
Figure 6I:
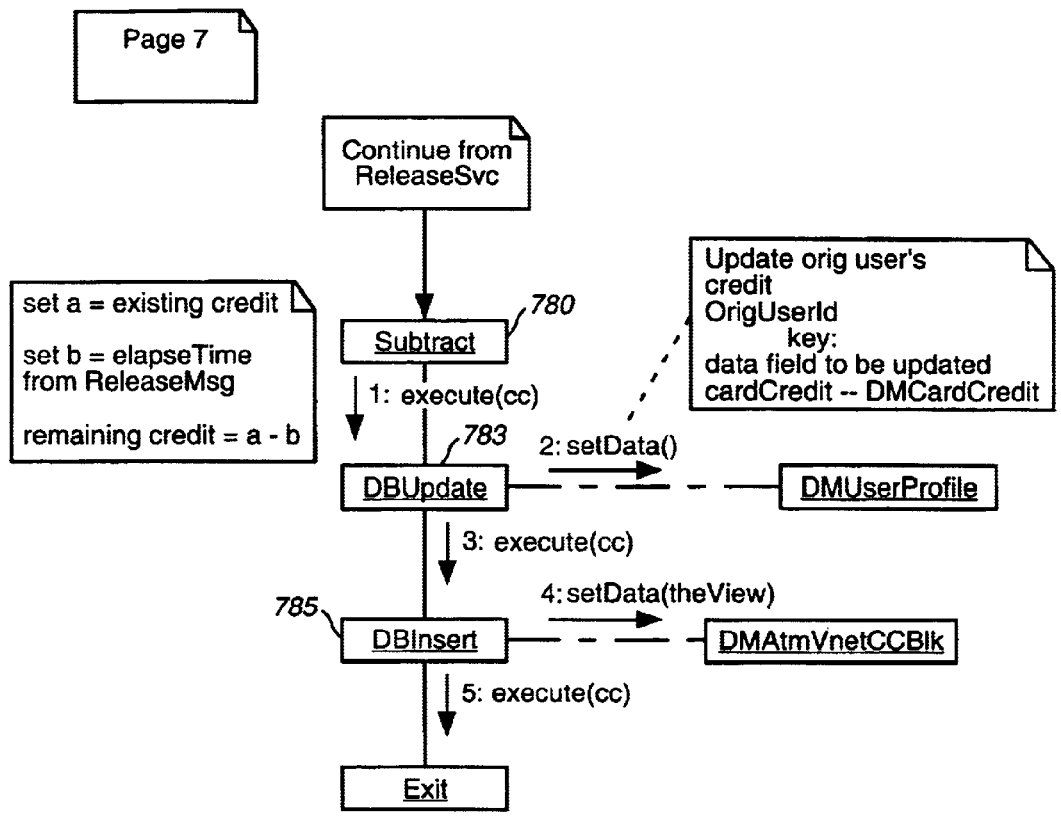

If, at step 758, if a trunk is returned, i.e., an outdial path found, then the process continues at step 760, FIG. 6(h), where the Vnet SLP queries the user profile of the calling party.

As depicted in FIG. 6(h), step 760, a database query in a User Profile database is performed using the Originating User ID as a key and invoking the SIBBDBR.java class to retrieve the user profile details. Then, at step 763, a comparison is made to determine if the user has enough available credit for a minimum call time. To make this comparison, a SIBBCompareInt.java class, an example of which is provided in Appendix E, is invoked to compare the user credit line detail with the minimum amount of cost for establishing the ATM/Vnet call. Next, at step 765, if it is determined that there is not enough credit to forward the call, the process proceeds to step 720, FIG. 6(c), to send a message to NGS via the SIBBSendMsg.java to initiate the tear down connection process and write the accumulated call context data to the call context object and/or database structure.

If, at step 765, it is determined that there is enough available credit, then the process continues at step 770 where the Vnet SLP process sends a MonitorConnectEvent message to the NGS along with a call identifier, e. g., thread id and object reference. This may be sent via a SIBBSendMsg.java (SIBB) used by SLPs for communicating messages. Particularly, the Vnet SLP performs an outdial request with a handoff command to the associated call logic program, including the termination address, so that the Vnet call may be routed to its destination. The subaddress field of the ATM setup message carries the "outpulse digits," if these differ from the network called party number. Additionally, the call MonitorConnectEvent message is a public class extending base class NGINEvent and is used to inform the NGS that if it should receive a connect message, it should send an event to NGIN.

Thus, as indicated at step 775, FIG. 6(*h*), a wait process is performed until NGS receives its indication that the Vnet call has been placed. A new instance of the SIBBWait.java class (SIBB) (Appendix A) is performed at this step to wait for a connect event. Once the Vnet call connection has been established, as indicated at step 775, the NGS sends a ConnectEvent message back to NGIN for the ATM_Vnet SLP thread instance identified by the returned object reference and thread ID. The parties to the call have been verified and connected at this point, and the ATM_Vnet process now waits for an eventual release event, as indicated at step 777. Preferably, the Release service is used to report the release event which may be caused when either the calling or called party terminates the call or, if user credit is run out. The ReleaseEvent relies on NNOS services for determining the time a release event is generated, and implements methods for determining the cause of the generating event and, the determining the amount of time elapsed from call connection to the release event. This information is returned with the Release service message.

Once a release service message has been received at step 777, the process continues to step 780, FIG. 6(*i*), where a process for subtracting the cost "b" relating to the elapsed time returned from the ReleaseMessage, from the existing user credit "a" established at step 763, FIG. 6(*h*), is performed. This entails invoking a SIBBSubtract.java class (SIBB), an example of which is provided in Appendix F, to perform the subtraction. Once the subtraction is performed, a user profile database update is performed at step 783 to update the users credit in light of the subtraction due to the placed Vnet call. This entails invoking the SIBBDBR.java class (SIBB) using the originating user ID as a key to set the updated data in the User Profile database. Then, as indicated at step 785, FIG. 6(*i*), prior to terminating the ATM_Vnet SLP, the process may additionally write accumulated call context data to the allocated call context database by invoking the SIBBDBInsert.java class (Appendix G).

Thereafter, the procedure entails sending the routing response information to the ELP 510 for placement in call context data, e.g., stored in DM; and, sending an outdial request with handoff command to the CLP 545 including the routing information. In this scenario, the terminating node may be remote, in which case it would be necessary to instantiate the terminating LLP on the remote node and performing a profile look-up to determine any features on the terminating line.

More particularly, an outdial/handoff procedure is implemented which requires the CLP 545 to send the outdial with the handoff command to the LLPO (originating line) which is forwarded to a NNOS agent at the call switch, which routes the Vnet call to the terminating node. The ELP process then writes the outdial call context data to DM.

Finally, Call Control then executes the instructions which may involve instructing NGS switch to set up and complete the call to a network termination. When the call has completed (i.e., when both parties have disconnected), the LLPs receive a call completion notification from the NNOS component at the switch and forwards the call completion notification to the CLP. The CLP forwards the call completion notification to the associated LLPs and ELP and are killed as triggered by the CLP notification. Prior to its termination, the ELP call detail data which needs to be maintained after the call completes, e.g., for billing and various other purposes, may first be stored. For instance, in the case of the ATM_Vnet service, the NGS switch writes packet count data to the ELP for billing purposes.

In addition to the foregoing, NGIN is capable of supporting the following functional requirements relating to Vnet service including, but not limited to: 1) the ability for national and international dialed VNET numbers to be screened; 2) the ability to translate VNET dialed number digits to a format (such as outpulse digits) that an NGS switch will understand, in order to support national or international DAL and Direct Distance Dialing (DDD) terminations; 3) the ability to allow international VNET calls to have a predetermined format including, for example, three (3) digits for identifying the country and the seven (7) digits indicating the private network number; 4) the capability to change the termination address obtained from the originating party and reroute the call to an alternate termination (Call Rerouting/Alternate Routing). The alternate termination may be a NANP DDD number, a Vnet termination, a mobile phone number, an international termination number IDDD, an ACD or a voice/fax mail system, etc. and any change made may be transparent to the calling party if necessary; 5) providing NXX Exchange Routing involving the use of the exchange code, and the Area ID (retrieved by using the customers NXX Exchange routing plan id), instead of the normal geographic lookup information, when performing termination translation; 6) providing the ability for VNET calls to be screened at the corporate, network, or access (originating switch, carrier) levels (Range Privilege Screening); 7) the ability to provide Remote Access to VNET, i.e., to designate 800, 900, and global freephone numbers for remote access to VNET. When such a number is dialed, a VNET dial tone is provided, as well as the nature of permissible VNET addresses, and how many supplementary digits to collect; 8) ability to provide a Route Data Calls capability, i.e., the ability for customers to order all digital routing for their VNET service. A digital route indicator (uses switch 56 path) is sent to the switch along with the route translation; 9) the support of private dialing plans of any business or residential customer. Currently, VNET customers may create their own network dialing plans, e.g., 4–12 digit national numbers dialing plans, and 7–15 digit international dialing plans may be defined; 10) the ability to perform VNET Card Validation, e.g., via an ADF message; 11) the ability to perform a Vnet work at home voice services, i.e., employees who work at home may be assigned a business number to their home phone. When they make business phone calls, they may use the Vnet service by dialing a *feature code prior to the Vnet number. The NGIN Vnet SLP accesses the Vnet dialing plan of the customer; translates the number to the Vnet termination; and charges the call to the Vnet business customer automatically. When an incoming call is received, a distinctive ringing may be applied to alert the user of a business call; and, 12) the capability to deactivate VNET cards and enable a user to deactivate VNET cards.

FIGS. 4(*a*) and 4(*b*) illustrate the physical architecture of a service node (site 45) incorporating Operator and Call Center Services system of the present invention. The site in FIG. 5(*a*) is shown as including one or more NGS components 50*a*, . . . , 50*n* each including the call control, bearer control and switch fabric components of a telecommunications network. The Service Control functions are embodied by Service Control Servers 405 which may comprise general purpose computers, such as an IBM RS6000, DEC Alpha Server, Pentium based Personal Computer, or the like, and running any standard operating system that is compatible with the computer on which it is running may be used; for example, Microsoft Windows NT, UNIX, Sun Solaris, or VMS. On top of the operating system, the NGIN SLEE 550 runs to provide the Service Control/SLEE environment within which the various Service Control processes including Operator and Call Center Services sub-components execute. As shown in FIG. 4(*a*), there may be one or more Service Control Servers 405*a*, ..., 405*n* at a site 45. Although a Service Control Server can embody multiple SLEEs, in the preferred embodiment, a single SLEE may consume an entire Service Control Server with a NOS Local Resource Manager ("LRM") component (not shown) executing at each Service Control Server that tracks and maintains the status of resources at a service node. Operation of the NOS LRM components is described in greater detail in above-mentioned, co-pending U.S. patent application Ser. No. 09/420,654, filed Oct. 19, 1999, now U.S. Pat. No. 6,425,005. As part of the resource tracking component, the NGIN system further implements a global network Resource Status ("NRS") process that maintains the status of all service node resources throughout the entire NGIN network. As further shown in FIG. 4(*a*), each NGS resource complex 50*a*–50*n* interfaces with Service Control Servers 405*a*, ..., 405*n* via high speed data links 57, such as provided by a LAN switch, e.g. a Gigabit Ethernet switch. Call Control and Service Control exchange Service Requests and Service Responses via links 57, using NOS. While an NGS switch 50 may be physically located at a specific service node, it has access to Service Control functions everywhere in the network, via NOS.

As described in co-pending U.S. patent application Ser. No. 09/421,590, filed Oct. 20, 1999, Data Management functionality is embodied by local DM cache and cache manager, DBOR Extract Manager, an SA Client, and application program interfaces DMAPIs and are depicted in FIGS. 4(*a*) and 4(*b*) as back-end DM servers 407*a*, ..., 407*n* which may be the same type of computer hardware/operating system as the Service Control Servers, but do not require a SLEE. In the preferred physical embodiment, a database server 407 is implemented as dual redundant processors with a shared disk array 408 comprising the DBOR Extract databases. The Service Control Servers 405*a*, ..., 405*n* interface with the back-end DM servers 407*a*, ..., 407*n* via high speed data links 58, such as provided by a LAN switch, e.g., Gigabit Ethernet switch. The Service Control/DM Server LAN 61 is partitioned from the NGS/Service Control LAN 63 used to interface the resource complex with the Service Control Servers, as the NGS/Service Control LAN 63 is used for data-intensive, real-time call processing functions, while the Service Control/Dm Server LAN 61 sees much less traffic, as most call processing data are cached to local memory in the Service Control Servers. The DM servers themselves are partitioned in accordance with different types of data. For example, one pair of servers 407*a*, 407*b* and corresponding shared disk array 408 is used for services (SLPs, SIBBs, etc.) and service data (customer profiles, routing tables, etc.) while a second pair of DM Servers, e.g., servers 407n–1, ..., 407*n* and corresponding shared disk array 418 are used for multi-media data (voice objects, fax objects, etc.). This second set of DM Servers is accessed by one or more Intelligent Peripheral ("IP") devices 65*a*, 65*b* via data switches 429. It should be understood that the collective architecture of the IPs 65*a*, 65*b*, DM Servers 407n–1, 407*n*, shared disk array 418 for multi-media data, and high speed data switches 429 is well-suited for interactive service platforms, such as Voice Response Units ("VRU").

As can be shown from the architecture of FIG. 4(*a*), the Intelligent Peripherals operate within the SLEE/NOS environment, and can thus receive service responses from Service Control Servers 405*a*, ..., 405*n*. For example, a Service Control Server may send a service response to an Intelligent Peripheral to play for a caller a certain audio message. Preferably, the IPs 65*a*, 65*b* are capable of receiving and handling telephony calls and are connected via voice links (which may be circuit-switched or packet-switched) to the switch fabric of NGS. The IP will use the Data Switch 429 to retrieve the requested audio object from the DM Server. The IPs can additionally include fax servers, video servers, and conference bridges. As can be readily understood, the site 45 architecture shown is highly scalable as additional service control servers, DM Servers, NGS platforms and Intelligent Peripherals may be easily added by connecting them to the site LAN and configuring them in service administration.

External interfaces, may also be linked to the site 45 and given an IP address as shown in FIG. 4(*b*). Particularly, various external interfaces 83 may be incorporated into the NGIN architecture 1000 as needed to provide process interfaces between NGIN and external systems that may be needed for call processing but that are not NOS compliant. An external interface thus adapts whatever communications protocols and messaging formats are used by an external system to NOS. In one embodiment, the interface may comprise a signaling gateway, which interfaces an NGIN process that uses NOS with an external system that uses a signaling system such as SS7, such as, for example, when performing an LIDB query. Therefore, an SS7 gateway is used to translate NOS messages to SS7 messages, and vice versa. In another embodiment, the external interface may constitute a Remote Data Gateway, which is used to interface NGIN with an external Service Control Point (not shown), for example, as may be owned by a large customer of a telecommunications service provider. The RDG translates NOS messages to whichever type of messages and communications protocols are needed by the remote SCP.

More particularly, FIG. 4(*b*) illustrates an example physical architecture of the NGIN system domain 1000 comprising a network 78 including a router-based or switch-based WAN 66 linking two or more sites 45*a*, ..., 45*n*, with at lease one site, e.g., site 45*a* integrating an Operator services system 800 of the invention, in addition to external interfaces 83. The NOS services traverse WAN 66 so that any process at any site can communicate with any other process at any other site. Several different configurations for the sites 45 may be used. For example, service nodes 45*a*, 45*b* are ones which embody both resource complex (switch) and Service Control functions. There may be sites dedicated to Data Management, shown as data management nodes 46. It should be understood that, in the context of the Operator and Call Center services, a customer requesting an Operator resource of a particular capability received at a site, e.g., 45*n*, may readily be assigned that Operator resource service having the requested capability as NGIN provides for the inter-process communication between an operator workstation 535, e.g., located at another site 45*a*, and the site at which the call was received.

It is key to understand that the IDNA/NGIN system eliminates the concept of specialized service nodes due to the distributed processing capabilities and the location-independent inter-process communications provided by NOS, and due to the platform-independence afforded by a common SLEE. As any service may be provided at any site 45, there is no need to transport a call to a specialized service node, i.e., a call may be processed at the first NGIN service node it accesses. It should be understood however, that with the high level of configurability provided by the NGIN system 1000, a network may be configured to have specialized service nodes. For example, network resources, such as conference bridges, are more cost-effective to deploy to a specialized service node.

A few preferred embodiments have been described in detail hereinabove. It is to be understood that the scope of the invention also comprehends embodiments different from those described, yet within the scope of the claims.

For example, the general purpose computer is understood to be a computing device that is not made specifically for one type of application. The general purpose computer can be any computing device of any size that can perform the functions required to implement the invention.

An additional example is the "Java" programming language can be replaced with other equivalent programming languages that have similar characteristics and will perform similar functions as required to implement the invention.

The usage herein of these terms, as well as the other terms, is not meant to limit the invention to these terms alone. The terms used can be interchanged with others that are synonymous and/or refer to equivalent things. Words of inclusion are to be interpreted as non-exhaustive in considering the scope of the invention. It should also be understood that various embodiments of the invention can employ or be embodied in hardware, software or microcoded firmware.

While the present invention has been disclosed and discussed in connection with the above-described embodiment, it will be apparent to those skilled in the art that numerous changes, variations and modifications within the spirit and scope of the invention are possible. Accordingly, it is, therefore, intended that the following claims shall encompass such variations and modifications.

What is claimed is:

1. A method for performing virtual network (Vnet) service relating to a Vnet request event received at a network resource complex associated with a service node provided in an intelligent communications network, said method comprising:
   a) receiving a Vnet service request at a resource complex associated with a service node;
   b) communicating information relating to each Vnet service request to a Vnet service agent object instance executing with an execution environment provided within a service node of said intelligent network;
   c) instantiating a Vnet service object thread via said Vnet service agent object instance for each Vnet service request and associating a unique transaction identifier with each Vnet service instance, a Vnet service object processing thread encapsulating logic for performing a Vnet service;
   d) for each Vnet service request, transferring said information from said resource complex indicating an originator of said Vnet service request and a destination number for said request to an executing Vnet service instance according to said unique identifier;
   e) determining a route plan for said Vnet call based upon said transferred information and on one or more factors as determined by said Vnet service thread instance; and,
   f) routing said Vnet call from said resource complex to said destination number based on said determined routing plan.

2. The method as claimed in claim 1, wherein prior to said step e) of determining a route plan, the step of utilizing said information transferred to said executing Vnet service thread to perform a database look-up to verify that a calling party is entitled to request said Vnet service according to a Vnet subscription; and, terminating said Vnet service request if said calling party is not entitled to perform said request.

3. The method as claimed in claim 2, wherein prior to said step e) of determining a route plan, the step of performing a database lookup to verify that said called party may receive a Vnet service call according to a Vnet subscription; and, terminating said Vnet service request if said called party is not entitled to receive said call.

4. The method as claimed in claim 1, wherein prior to said step e) of determining a route plan, the step of performing a database lookup to verify that said calling party and said called party belong to a closed-user group permitting said Vnet call to be routed.

5. The method as claimed in claim 1, wherein prior to said step e) of determining a route plan for said Vnet call, the step of determining a current time for the received Vnet service request.

6. The method as claimed in claim 5, wherein said one or more factors includes the current time of year, said routing plan based on the time of year of said Vnet service request.

7. The method as claimed in claim 5, wherein said one or more factors includes the current time of day, said routing plan based on the time of day of said Vnet service request.

8. The method as claimed in claim 5, wherein prior to step h) of routing said Vnet call, the step of performing a database lookup to determine a switch to enable routing of said Vnet call from said resource complex to said destination number based on said routing plan.

9. The method as claimed in claim 5, wherein prior to step h) of routing said Vnet call, the step of performing a database lookup to determine an outdial path for routing said Vnet call from said resource complex to said destination number based on said routing plan.

10. The method as claimed in claim 5, wherein prior to step h) of routing said Vnet call, the step of determining available credit associated with said calling party and routing said call if enough credit is available, or terminating said Vnet call if not enough credit is available.

11. The method as claimed in claim 10, wherein after step h) of routing said Vnet call, the step of updating said credit associated with said calling party.

12. The method as claimed in claim 1, wherein said Vnet service event is communicated as an ATM message, said information including quality of service parameters associated with a Vnet subscription.

13. The method as claimed in claim 12, wherein said step h) of routing said Vnet call from said resource complex to said destination number based on said determined routing plan includes validating said quality of service parameters against the calling party's subscription and against a current network utilization to determine if said Vnet call can be routed.

14. The method as claimed in claim 1, wherein said step b) of communicating further includes the step of enabling a platform independent operating system to communicate information relating to each Vnet service request to said Vnet service agent object instance, said message communicated from said resource complex includes a port ID number and a Terminal ID number corresponding to an originating location of said Vnet service request.

15. The method as claimed in claim 1, wherein said platform-independent operating system further provides a mapping of a logical name associated with a Vnet service request to a physical address associated with an executing Vnet service agent object instance in said service execution environment prior to communicating said information to said Vnet service agent object instance.

16. A system for performing virtual network (Vnet) services relating to a Vnet request event received at a network resource complex associated with a service node provided in an intelligent communications network, said system comprising:

a) service execution environment for executing one or more service objects associated with performing a Vnet service;

b) Vnet service agent object executing within a service execution environment and responsible for instantiating a Vnet service object thread instance for each Vnet request received and associating a unique transaction identifier therewith;

c) platform-independent communication system for transferring information relating to each Vnet service request to said Vnet service agent object instance, said information including an originator of said Vnet service request and a destination number for said request, said Vnet service agent object instance forwarding said information to an executing Vnet service thread instance according to said unique identifier;

d) mechanism for determining a route plan for each received Vnet call based upon said transferred information and on one or more factors as determined by said Vnet service thread instance; and, h) mechanism for routing said Vnet call from said resource complex to a destination number based on said determined route plan.

17. The system as claimed in claim 16, wherein said Vnet service thread instance includes mechanism for performing a database look-up to verify that a calling party is entitled to request said Vnet service according to a Vnet subscription.

18. The system as claimed in claim 16, wherein said Vnet wherein said information includes a port ID number and a Terminal ID number, said mechanism for performing a database lookup including querying a source address screening database utilizing said port ID number and a Terminal ID number as keys to determine that a calling party is entitled to make said Vnet service request; said executing Vnet service thread terminating said Vnet service request if said calling party is not entitled to perform said request.

19. The system as claimed in claim 16, wherein said Vnet service thread instance includes mechanism for performing a database look-up verify that said called party may receive a Vnet service call according to a Vnet subscription; and, terminating said Vnet service request if said called party is not entitled to receive said call.

20. The system as claimed in claim 16, wherein said Vnet service thread instance includes mechanism for performing a closed user group database query to determine if said and calling party is entitled to call said called party according to a Vnet service subscription.

21. The system as claimed in claim 16, wherein said Vnet service thread instance further determines a current time for the received Vnet service request.

22. The system as claimed in claim 21, wherein said one or more factors includes the current time of year, said mechanism for determining a route plan including performing a time of year database query to find a routing choice based on a time of year of said received request.

23. The system as claimed in claim 21, wherein said one or more factors includes the current time of day, said mechanism for determining a route plan including performing a time of day database query to find a routing choice based on a time of day of said received request.

24. The system as claimed in claim 23, wherein said mechanism for determining a route plan includes mechanism for performing a database lookup to determine a switch to enable routing of said Vnet call from said resource complex to said destination number based on said routing choice.

25. The system as claimed in claim 24, wherein said mechanism for determining a route plan includes mechanism for performing a database lookup to determine an outdial path for routing said Vnet call from said resource complex to said destination number based on said routing plan.

26. The system as claimed in claim 25, wherein said Vnet service object thread instance further includes mechanism for querying a user profile database query to determine if said calling party has enough available credit to route said received call, and routing said call if enough credit is available, or terminating said Vnet call if not enough credit is available.

27. The system as claimed in claim 26, wherein said Vnet service object thread instance further includes mechanism updating said credit associated with said calling party after routing said Vnet call.

28. The system method as claimed in claim 16, wherein said Vnet service event comprises an asynchronous transfer mode (ATM) message, said information including quality of service parameters associated with a Vnet subscription.

29. The system as claimed in claim 28, wherein said Vnet service object thread instance further includes mechanism for validating said quality of service parameters against the calling party's subscription and against a current network utilization to determine if said Vnet call can be routed according to said routing plan.

30. The system as claimed in claim 16, further including a feature discriminator object instance for receiving said message associated with a received call from said resource complex and determining from said message which Vnet service agent object to execute based on said handed-off message.

31. The system as claimed in claim 16, further including a line logic program object instance for maintaining a current state of a network access line at said resource complex, said line logic program maintaining a state of both an originating and terminating network access line.

32. The system as claimed in claim 16, further including an event logic program object functioning as a repository for all Vnet service processing event data associated with each received call.

33. The system as claimed in claim 16, further including call logic program for maintaining the current state of a Vnet service call by associating all service logic programs, line logic programs and event logic programs executed with respect to a received call.

34. The system as claimed in claim 16, wherein said Vnet service logic object is based on combinations of indivisible functional building blocks each for performing a function independent of a said Vnet service.

* * * * *

UNITED STATES PATENT AND TRADEMARK OFFICE
CERTIFICATE OF CORRECTION

PATENT NO. : 6,788,649 B1 Page 1 of 1
APPLICATION NO. : 09/420657
DATED : September 7, 2004
INVENTOR(S) : Dugan et al.

It is certified that error appears in the above-identified patent and that said Letters Patent is hereby corrected as shown below:

On Title page, under section (75) Inventors, please change "McDyson" to --McDysan--.

Signed and Sealed this

Eighteenth Day of July, 2006

JON W. DUDAS
*Director of the United States Patent and Trademark Office*